United States Patent
Chen et al.

[11] Patent Number: 6,127,462
[45] Date of Patent: Oct. 3, 2000

[54] COMPOSITIONS OF EPOXYSILANE AND REACTIVE POLYMER WITH CURE CATALYST AND METHODS OF PREPARATION

[75] Inventors: Ming J. Chen, Valley Cottage; Frederick D. Osterholtz, Pleasantville, both of N.Y.

[73] Assignee: OSi Specialities, Inc., Greenwich, Conn.

[21] Appl. No.: 08/902,127

[22] Filed: Jul. 30, 1997

Related U.S. Application Data

[63] Continuation-in-part of application No. 08/735,055, Nov. 7, 1996, Pat. No. 5,714,532, which is a continuation of application No. 08/420,389, Apr. 12, 1995, abandoned.

[51] Int. Cl.[7] .................................................. C08F 8/00
[52] U.S. Cl. ........................... 524/114; 524/458; 524/506; 524/522
[58] Field of Search .................................... 524/114, 458, 524/506, 522

[56] References Cited

U.S. PATENT DOCUMENTS

| | | |
|---|---|---|
| 3,399,870 | 9/1968 | Hadlock . |
| 3,449,293 | 6/1969 | Burzynski et al. . |
| 3,499,870 | 3/1970 | Hadlock et al. . |
| 3,629,214 | 12/1971 | Buning et al. . |
| 3,706,697 | 12/1972 | Backderf . |
| 3,729,438 | 4/1973 | Plesich et al. . |
| 3,755,252 | 8/1973 | Buning et al. . |
| 3,814,716 | 6/1974 | Kowalski et al. . |
| 3,821,174 | 6/1974 | Buning . |
| 4,049,869 | 9/1977 | De Long . |
| 4,062,451 | 12/1977 | Gander . |
| 4,309,326 | 1/1982 | Sage et al. . |
| 4,394,418 | 7/1983 | Temple . |
| 4,399,247 | 8/1983 | Ona et al. . |
| 4,526,930 | 7/1985 | Keogh . |
| 4,684,697 | 8/1987 | Chang et al. . |
| 4,687,818 | 8/1987 | Kawakubo et al. . |
| 4,716,194 | 12/1987 | Walker et al. . |
| 4,719,194 | 1/1988 | Cletek . |
| 4,778,624 | 10/1988 | Ohashi et al. . |
| 4,788,254 | 11/1988 | Kawakubo et al. . |
| 4,818,779 | 4/1989 | Witucki et al. . |
| 4,877,654 | 10/1989 | Wilson . |
| 4,889,747 | 12/1989 | Wilson . |
| 5,017,632 | 5/1991 | Bredow et al. . |
| 5,100,955 | 3/1992 | Pons et al. . |
| 5,196,054 | 3/1993 | Schmuck et al. . |
| 5,219,925 | 6/1993 | Stephens . |
| 5,226,954 | 7/1993 | Suzuki . |
| 5,385,955 | 1/1995 | Tarshiani et al. . |
| 5,599,597 | 2/1997 | Volkmar et al. . |

FOREIGN PATENT DOCUMENTS

| | | |
|---|---|---|
| 2093606 | 10/1993 | Canada . |
| 0401496 | 12/1990 | European Pat. Off. . |
| 62-5502 | 1/1984 | Japan . |
| 730900 | 4/1980 | U.S.S.R. . |

OTHER PUBLICATIONS

Chemical Abstract No. 120:56799f (1994).
Chemical Abstract No. 93:97224g (1980).
Chemical Abstract No. 86,18947 (1977).
Chemical Abstract No. 74,96730 (1971).
Bourne, T.R., Bufkin, B.G., Wildman, G.C., Grawe, J.R.; Feasibility of Using Alkoxysilane—Functional Monomers; Univ. Of Mississippi; 1982.
Lutz, M.A., Polmanteer, K.E.; Methyltrimethoxysilane Modification of Organic Latexes; Dow Corning Corp. May, 1979.

*Primary Examiner*—Bernard Lipman
*Attorney, Agent, or Firm*—Scully, Scott, Murphy & Presser

[57] ABSTRACT

The present invention provides stable epoxy silane solutions and emulsions and methods for the preparation of stable epoxy-silane solutions and emulsions comprising: (I) a water insoluble or slightly soluble epoxysilane; (II) optionally, an emulsifier; (III) water; (IV) a water dispersible polymer containing a functional group with an active hydrogen; and (V) a catalyst. Also provided are two part systems such that an epoxysilane solution or emulsion comprising components (I)–(III) are combined and the components (IV) and (V) may be added upon use of components (I) to (III). Moreover, additional components, such as pH buffers may be added. Said compositions may be used for, among other things, coatings, adhesives and sealants. The water epoxy functional silane for use herein are of the general structure $R^1_a R^2_b Si(OR^3)_{4-a-b}$ where $R^1$ is an epoxy substituted alkyl or aralkyl group, where the alkyl may have from four to thirty carbon atoms, $R^3$ is an alkyl or alkoxy-substituted alkyl, aryl or aralkyl group having from one to ten carbon atoms, $R^2$ is an alkyl group or alkoxy substituted alkyl, aryl or aralkyl group having from one to ten carbon atoms, a is one to three, and b is zero to two, with the proviso that a+b is 1, 2, or 3. $R^1$, $R^2$, and $R^3$ group may be cyclic, branched or linear.

13 Claims, No Drawings

COMPOSITIONS OF EPOXYSILANE AND REACTIVE POLYMER WITH CURE CATALYST AND METHODS OF PREPARATION

This application is a continuation-in-part of application Ser. No. 08/735,055, filed Nov. 7, 1996, U.S. Pat. No. 5,714,532 which is a continuation of application Ser. No. 08/420,389, filed Apr. 12, 1995, now abandoned.

BACKGROUND OF THE INVENTION

Conventional organic solvent based polymer compositions have become disfavored due to problems associated with environmental pollution, conservation of resources and providing a safe working environment. Instead, aqueous solution or dispersion type coating compositions have been proposed as alternatives. In particular, much attention has been paid to reactive polymer emulsions and dispersions because of the ease with which they provide improved properties such as water and solvent resistance.

The use of combinations of polymers, aqueous emulsions and dispersions (latices) and epoxy resins or compounds is well known in the art. For example, U.S. Pat. No. 4,049,869 to Long taught a composition including a high acid acrylic latex (5 to 20% by weight), a crosslinking agent (1 to 10%) and an ultraviolet absorber for use in preserving porous inorganic substrates. The crosslinking agent can include an epoxy resin.

Water-soluble silanes as additives in latex systems have also been disclosed in the prior art. For example, U.S. Pat. No. 5,017,632 to Bredow disclosed coating compositions for Portland cement or metal. The coating composition thereof can be mixed from a pair of storage stable components; a dry mix including a fine particle size filler, an epoxy resin and optionally, a coarse aggregate, and a wet mix including a polymer latex, an amine-functional epoxy curing agent, and a water-soluble epoxy- or amino-silane.

U.S. Pat. No. 5,100,955 to Pons disclosed coating and adhesive compositions based on aqueous dispersions of addition polymers of one or more olefinically unsaturated monomers, emulsion stabilizers and/or emulsifiers and a water-soluble epoxysilane. The water-soluble epoxysilane is added preferably after the polymerization of the addition polymer. The shelf life, however, of such compositions is only from two to three days.

EP Patent No. 401,496 to Hahn disclosed aqueous silicon-modified plastic dispersions as adhesives by epoxysilane-treatment of a dispersion of emulsion copolymers containing carboxylic acid, amide and sulfonic acid groups. Water soluble epoxysilanes of the formula $R_1R_2R_3R_4Si$ are disclosed with $R_1$=(cyclo)alkyl with reactive oxirane group; $R_2$=(cyclo)alkoxy, (cyclo)alkyl, aryl or aralkyl; $R_3$, $R_4$= (cyclo)alkoxy, or OH. However, the composition of the synthetic latex is specific. Furthermore, the neat epoxysilane is added directly to the polymer.

In addition to these coating technologies, emulsions of trialkoxysilanes have been previously reported used as waterproofing agents. For example, buffered aqueous silane emulsions are disclosed in U.S. Pat. Nos. 4,877,654 and 5,393,330. Alkylalkoxysilanes are also emulsified with nonionic and anionic emulsifiers for water repellency properties in U.S. Pat. No. 5,226,954.

SUMMARY OF THE INVENTION

The present invention provides shelf stable compositions comprised of epoxysilane, a water dispersible or emulsifiable organic polymer which contains a functional group with an active hydrogen, together with a catalyst for curing the composition.. The corresponding method of the present invention for the preparation of a shelf stable composition comprises combining an epoxysilane compound in water with the organic polymer which contains a functional group with an active hydrogen, and adding at any point a catalyst for curing the composition..

One embodiment of the present invention provides shelf stable compositions comprised of water-insoluble or slightly soluble epoxysilanes, emulsifier and a water dispersible or emulsifiable organic polymer which contains a functional group with an active hydrogen, together with a catalyst for curing the composition.. The method of the present invention for the preparation of such a shelf stable composition comprises: (a) dispersing a water insoluble or slightly soluble epoxysilane compound in an aqueous solution with emulsifier to yield an aqueous emulsion, and (b) adding the silane emulsion to a water dispersed or emulsified organic polymer which contains a functional group with an active hydrogen, and adding at any point a catalyst for curing the composition..

Another aspect of the present invention is to provide an article coated and cured with any of the aforementioned reactive, aqueous compositions.

The compositions of the present invention are stable for at least about six (6) months. Moreover, improved properties such as solvent resistance, adhesion, smoothness, hardness and mar resistance are achieved with compositions of the present invention.

DETAILED DESCRIPTION OF THE INVENTION

The present invention provides stable epoxy silane containing compositions and methods for the preparation of stable epoxy-silane containing compositions comprising: (I) an epoxysilane, which can be a water soluble, water insoluble or slightly soluble epoxysilane; (II) optional emulsifier; (III) water; (IV) water dispersible or emulsified polymer containing a functional group with an active hydrogen; and (V) a catalyst for cure of the composition. Also provided are two part systems such that an epoxysilane emulsion comprising components (I)–(III) are combined and the components (IV) and (V) may be added upon use of components (I) to (III). Moreover, additional components, such as pH buffers may be added. Contemplated herein are also compositions for the preparation of the above compositions, namely the silane (I), the emulsifier (II), and the catalyst (V).

The present invention provides highly stable epoxysilane containing compositions that do not seed or gel during storage. Generally, they are stable for at least two to three weeks and more preferably two to three months. In fact, these compositions containing less than twenty weight percent epoxysilane last longer than six months of storage. This compares favorably with the prior art which taught silane/polymer compositions which would lose properties, such as adhesion, or even gel after two-three weeks.

The catalyst can be any that permits curing of the composition at lower temperatures, on the order of 150° F., than is the case with compositions not containing the catalyst. The presence of the catalyst provides the additional advantage that one can use relatively water-soluble epoxysilanes and catalysts, thus providing greater freedom of operation and permitting the user to avoid having to use an emulsifier where such a component is not desired.

The cured product exhibits very satisfactory to superior properties such as high resistance to chemicals and high resistance to stains.

(I) SILANES

The epoxy functional silanes useful herein are of the general structure $R^1_a R^2_b Si(OR^3)_{4-a-b}$ where $R^1$ is an epoxy substituted alkyl or aralkyl group, where the alkyl may have from four to thirty carbon atoms, $R^3$ is an alkyl or alkoxy-substituted alkyl, aryl or aralkyl group having from one to ten carbon atoms, $R^2$ is an alkyl group or alkoxy substituted alkyl, aryl or aralkyl group having from one to ten carbon atoms, a is one to three, and b is zero to two, with the proviso that a+b is 1, 2, or 3. Each R group may be cyclic, branched or linear. Water insoluble or slightly soluble silanes useful in this invention include silanes with solubilities between 0.1 and 8.0 weight percent in water. Water insoluble epoxy silanes are preferred. However, water soluble silanes can be used although compositions made with such silanes may be less stable for extended periods of time, i.e., more than two to three days at ambient conditions.

The preferred epoxy functional silanes include:

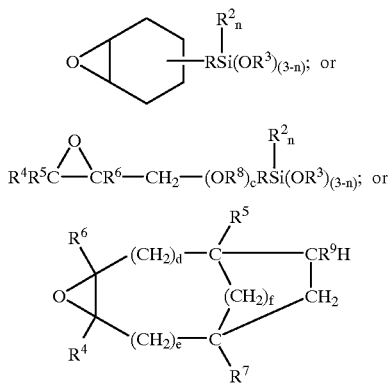

where: R is $(CH_2)_m$, where m has a value of zero to six;

$R^2$ is an alkyl, alkoxy-substituted alkyl, aryl or aralkyl group, each of said groups having from one to ten carbon atoms;

$R^3$ is an alkyl, alkoxy-substituted alkyl, aryl or aralkyl group, each of said groups having from one to ten carbon atoms;

$R^4$, $R^5$, $R^6$ or $R^7$ are each hydrogen or an alkyl group having from one to six carbon atoms;

$R^8$ is an alkyl group having from one to four carbon atoms or aralkyl or aryl group having six to ten carbon atoms;

$R^9$ is $RSi(OR^3)_{3-n}$
$R^2_n$ n has a value of zero, one or two;

c, d and e each have a value of zero or one; and f has a value of zero, one or two.

More specifically, $R^2$ denotes a substituted or unsubstituted monovalent hydrocarbon group exemplified by alkyl groups (e.g., methyl, ethyl, isobutyl,, and octyl groups), alkenyl groups (e.g., vinyl and allyl groups), aryl groups (e.g., phenyl, tolyl and naphthyl groups), and aralkyl groups (e.g., benzyl and 2-phenylethyl groups), as well as those substituted groups obtained by the replacement of one or more of the carbon atoms in the above named hydrocarbon groups with various kinds of atoms and/or groups including sulfur and oxygen, and/or replacement of one or more of the hydrogen atoms in the above named hydrocarbon groups with various kinds of groups, including, but not limited to, halogen atoms, epoxy, methacryloxy, acryloxy, carboxyl, ester, cyano, and polyoxyalkylene groups.

$R^3$ are alkyl, alkoxyalkyl, aryl or aralkyl radicals such as methyl, ethyl, n-propyl, n-butyl, n-hexyl, n-heptyl, n-octyl, n-nonyl, n-decyl, and cyclo radicals such as cyclopentyl, cyclohexyl, cycloheptyl, and cyclooctyl. Illustrative of suitable branched chain hydrocarbon radicals for $R^2$ are alkyl radicals such as isopropyl, isobutyl, sec-butyl, isobutyl, sec-amyl, and 4-methyl-2-pentyl. Alkoxyalkyl groups may be exemplified by n-butoxy ethyl and methoxy propyl. Aryl groups may be exemplified by phenyl and aralkyl groups may be exemplified by benzyl or ethyl phenyl.

Water soluble epoxysilanes can be provided by formulating such that all $R^3$ groups are methyl. Water dispersible epoxysilanes, which are of lesser water solubility, are characterized in that the $R^3$ groups contain two or more carbon atoms.

$R^4$, $R^5$, $R^6$ or $R^7$ are hydrogen atoms or monovalent hydrocarbon groups having 1 to 6 carbon atoms exemplified by alkyl groups (e.g., methyl, ethyl, propyl, isopropyl, n-butyl and isobutyl groups), alkenyl groups (e.g., vinyl and allyl groups), and aryl groups (e.g., phenyl group). These hydrocarbon groups may be substituted by halogen atoms and functional groups, including cyano and epoxy, for a part or all of the hydrogen atoms therein.

Examples of epoxy functional silanes used in accordance with the present invention include, but are not limited to, those silanes described by Brison and Lefort in French Patent No. 1,526,231. Specific examples are 2-(3,4-epoxycyclohexyl) ethyltriethoxysilane, 4-(methyldiethoxysilyl)-1,2-epoxycyclohexane, 3-(3,4-epoxycyclohexyl)propyl tri(isobutoxy) silane, 3-(2,3-epoxybutoxy)propyltriethoxysilane, and [2.2.1] bicycloheptane 2,3-epoxy-5-(2-triethoxysilyl)ethyl.

The silane(s) is present at 0.1 to 30 percent by weight of the total composition [(I)–(V)]. The preferred concentration is about 0.1 to 10 percent of the weight of the total composition. In preparing the precursor epoxy silane emulsion, as defined by components (I)–(III), the silane(s) is present at 0.1 to 60 weight percent.

(II) EMULSIFIER (OPTIONAL)

The emulsifiers for use herein, when such a component is desired, include nonionic, anionic and cationic surfactants or mixtures of nonionic with anionic or cationic surfactants. Examples of the nonionic surfactants include polyoxyethylene alkyl ethers, polyoxyethylene alkyl phenyl ethers, polyoxyethylene fatty acid esters, sorbitan fatty acid esters, and polyoxyethylene sorbitan fatty acid esters. Examples of the anionic surfactants include fatty acid salts, alkyl sulfate ester salts, alkyl benzene sulfonate, alkyl phosphate, alkylallyl sulfate ester salt, and polyoxyethylene alkylphosphate ester. Examples of the cationic surfactants include quaternary ammonium salts such as long chain alkyl trimethylammonium salts, long chain alkyl benzyl dimethyl ammonium salts, and di(long chain alkyl) dimethyl ammonium salts. A further listing of surfactants useful in the present invention may be those described in 1994 McCutcheon's Vol. 2: *Functional Materials,* North American Edition (The Manufacturing Confectioner Publishing Co., Glen Rock) 1994, which is incorporated herein by reference.

The emulsifier(s) when used should be present in the range of 0.05 to 30 weight percent based on weight of the total composition of (I)–(V) and preferably 0.2 to 20 weight percent of the total composition. In precursor epoxysilane emulsions containing an emulsifier, the emulsifier should be present at 0.1 to 50 weight percent of the epoxy silane (I).

The appropriate HLB (hydrophilic-lipophilic balance) of the surfactants is chosen to correspond to the HLB of the specific epoxy silane being emulsified. The method for selecting the optimum HLB for a substance is well known to one skilled in the art and described in "The HLB System" by ICI Americas Inc.

Because the reactive polymer emulsion, as defined by components (II)–(IV), may be prepared prior to the addition of the precursor epoxy silane emulsion, emulsifiers of the type described above can be used in preparing these precursor compositions. Again, the emulsifiers are chosen so that the appropriate HLB is chosen to correspond to the HLB of the specific reactive polymer being emulsified with the proviso that the emulsifier(s) chosen to emulsify the reactive polymer are compatible with the emulsifier(s) used to make the precursor epoxysilane emulsion. In the precursor reactive polymer emulsion, the emulsifier should be present at 1 to 50 weight percent of the reactive polymer.

(III) WATER

The water may be present in an amount ranging from 29.85 to 99.75 weight percent of the total composition (I)–(IV). When a precursor silane emulsion is made without the polymer, about 39 to 99.75% water should be present.

(IV) POLYMERS

The reactive polymers of the present invention are those which have an active hydrogen thereon, preferably in the form of a carboxylic group. Exemplary of such polymers are those which contain terminal or pendant carboxyl groups (—COOH), some of which may be in its neutralized salt form (e.g., —COOK). These reactive polymers have molecular weights between 500 and $10^8$ gms/mole. The preferred reactive polymer contains a carboxylic acid group in an amount sufficient to have an acid number, as determined by ASTM D669, between 1 and 780, and preferably, between, 10 and 280. The polymers may be added as dispersions, with no emulsifier, or as emulsions, with emulsifiers therein.

Examples of reactive polymers which can be used in the present invention include carboxylic acid modified polymers chosen from the following: polyethylene, polypropylene, polyethylene propylene copolymer, urethanes, epoxies, polystyrenes and urethane acrylic polymers. Also useful herein are acrylic homopolymers, vinyl acrylic polymers, methacrylic polymers, styrene acrylic copolymers, and polyesters. These reactive polymers may also contain other organic functional groups, including hydroxyl, amide, vinyl and halogens are contemplated as being within the scope of reactive polymers.

Specific examples of preferred reactive polymers which can be used in accordance with this invention include commercially available styrene acrylic emulsion polymers, such as JONCRYL®s 554, 540,77, and 95, and SCX 2500, all commercially available from SC Johnson Polymer of Racine, Wis. Other specific examples of commercially available preferred reactive polymers materials which can be used include NEOCRYL® acrylic emulsions, NEOREZ® water-borne urethane polymers and NEOPAC® water-borne urethane acrylic copolymers, available from ZENECA Resins of Wilmington, Mass., and UCAR® acrylic and vinyl acrylic latexes available from Union Carbide Corporation of Danbury, Conn.

Polymer dispersions, which contain no emulsifiers, may also be used herein.

The polymer should be present at 0.1 to 70 weight percent of the total composition.

(V) CATALYST

The compositions of the present invention should contain a catalyst component, composed of one or more than one catalyst capable of enabling the composition to cure faster at ambient or elevated temperatures compared to the same composition without the catalyst.

Several types of compounds are useful in this regard. Examples of types of useful compounds include amines, organotin compounds, organoammonium halides, and organophosphonium halides.

Useful amine compounds include:

heterocyclic amines, preferably imidazoles but also including piperazines, pyridines, and pyrrolidines, and including heterocyclic amines which are unsubstituted or substituted with one or more alkyl groups containing 1 to 6 carbon atoms, or with one or more silyl-$C_1$-$C_4$-alkyl groups wherein the silyl atom is substituted with a total of three substituents selected from the group consisting of alkyl and alkoxy groups containing 1 to 6 carbon atoms; preferred examples of catalysts of this type include 2-ethyl-4-methyl-1H-imidazole and 1-[3-(trimethoxysilyl)propyl}-1H-imidazole;

tertiary amines, wherein the nitrogen atom is substituted with a total of three substituents selected from the group consisting of alkyl containing 1 to 6 carbon atoms, unsubstituted benzyl, and benzyl substituted with one or more of alkyl containing 1 to 6 carbon atoms, hydroxyl, and dialkylaminoalkylene wherein each alkyl group contains 1 to 6 carbon atoms and the alkylene bridge contains 1 to 6 carbon atoms (preferred examples of this type of amine catalyst including N-benzyl-N-dimethylamine, and tris-2,4,6-(dimethylaminomethyl)phenol);

polyamides; and polyalkylene polyamines, corresponding to the formula $H_2N$-$(ALK$-$NH)_i$-$H$ wherein i is 1 to 10 and preferably 2–4, and each ALK is $C_2H_4$, $C_3H_6$, or $C_4H_8$ and preferably $C_2H_4$ (a preferred example of this type of amine catalyst being tetraethylenepentamine).

Useful organotin compounds include mercaptoalcohol, mercaptide or sulfide forms of diorganotin having a Sn—S or Sn=S bond. Further, illustrative examples are $R_2Sn$ (SCOO) type compounds, such as $(n$-$C_4H_9)_2Sn$ (SCH$_2$COO); $R_2Sn(SS)$ type compounds, such as $(n$-$C_8H_{17})_2Sn(SCH_2COOCH_2CH_2OCOCH_2S)$; $R_2Sn$ (SCH$_2$COOR)$_2$ type compounds, such as $(n$-$C_4H_9)_2Sn$ (SCH$_2$COOC$_8$H$_{17}$-iso)$_2$; $RSn(SCH_2COOR)_3$ type compounds, such as $(n$-$C_4H_9)Sn(SCH_2COOC_8H_{17}$-iso)$_3$; $R_2Sn$=S compounds, such as $(n$-$C_8H_{17})_2Sn$=S or the like; and

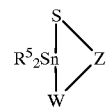

where $R^5$=1–8 carbon atoms alkyl or aryl; W=—S— or —O—; and Z=—CH$_2$CH(CH$_2$OH)— or —CH$_2$CH(OH)CH$_2$—. Preferred examples are FOMREZ UL-1, UL-22, and UL-32 from Witco and dibutyltin bis(1-thioglycerol), dibutyltin oxide and dibutyltin ditnercaptide.

Useful organoammonium halides and organophosphonium halides are Lewis acids corresponding respectively to the structures $(A^1)(A^2)(A^3)N$-halide and $(A^1)(A^2)(A^3)(A^4)$ P-halide wherein $A^1$, $A^2$, $A^3$ and $A^4$ are independently alkyl containing 1 to 4 carbon atoms, benzyl, or phenyl, and halide is chloride or bromide. The ammonium compounds are preferably substituted with at most one benzyl or phenyl group, whereas the phosphonium compounds can be substituted with 0 to 3 benzyl or phenyl groups. Preferred examples are benzyltrimethylammonium chloride and butyl-(or ethyl-)triphenylphosphonium bromide.

The compositions of the present invention optionally may comprise other water soluble/emulsifiable/dispersible curing catalysts, which are hydrolytically stable, to modulate the curing conditions. Examples of such catalysts are organotitanate, organotin, chelated titanium, aluminum and zirconium compounds, and combinations thereof. Examples of chelated titanates are dihydroxy bis [2-hydroxypropanato (2-)-$O^1,O_2$] (2-) titanate, mixed titanium ortho ester complexes, acetylacetonate chelate, bis(ethyl-3-oxobutanolato-$O^1,O^3$] bis(2-propanolato) titanium, isopropoxy(triethanolaminato) titanium and alkanolamine complex of titanium. Examples of organotin catalysts are FOMREZ® UL-1, UL-22, and UL-32 from Witco of Greenwich, Conn. and dibutyltin bis(1-thioglycerol).

The catalyst can be used in an amount of 0.01 to 20 percent, preferably 0.1 to 10 parts, based on reactive polymer component (IV).

(VI) OPTIONAL INGREDIENTS

The composition of the present invention may additionally: contain cross-linking agents, such as urea and melamine resins which are methylolated and/or alkoxylated, epoxy resins, aziridines and carbodiimides. Such agents may be present at 0.1 to 20 weight percent of the total composition, as long as they do not destabilize the composition during storage.

The pH of the total composition may impact upon its hydrostability. High alkalinity or high acidity of the composition catalyzes the hydrolysis and condensation of the alkoxysilyl group of the epoxy silane. The closer the pH of the composition is to neutral (pH=7), the better the stability of the emulsion. Therefore, the preferred range of pH of the total composition is 5.5 to 8.5. Substances which can be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

Other optional ingredients for inclusion herein are fillers, thixotropes, pigments, plasticizers, coalescing agents, biocides and fungicides as are commonly known and used in the art.

METHOD OF PREPARATION AND USE

The precursor epoxysilane compositions of the present invention are prepared by first mixing the epoxy functional silane (I) with water. If desired, an emulsifier (II) is added and the mixture is stirred to provide a white, milky emulsion. The pH of the resulting aqueous solution or emulsion is adjusted, if necessary, to pH 7.0±1.5.

The precursor epoxysilane solution or emulsion is added to the reactive polymer (IV) or to a reactive polymer emulsion [Components (II)–(IV)] to provide a stable composition. The method employed to mix these components is not critical and any commonly used low shear equipment, such as a blade or paddle mixer, is suitable. The catalyst (V) and any optional ingredients (VI) may be added at any time, although in some cases catalysts should be added last.

The solutions and emulsions may be used as two component systems, i.e., components (I)–(III) and components (IV)–(V), mixed in shortly before use, but have sufficient stability when mixed to be used as one-component systems. The composition of components (I)–(V) form uniform aqueous solutions, dispersions or emulsions. Many uses of these compositions require drying under ambient conditions or at moderately elevated temperatures (e.g., baking). The resulting dried material has excellent solvent resistance, chemical resistance, hardness, mar resistance, adhesion, water resistance, durability or weatherability.

The compositions made according to the present invention may be used as industrial and architectural coatings, sealants, wood coating, adhesives and in mastics, i.e., generally in any application where the polymer would be used. For example, in textile print paste applications, the composition of the present invention would provide crock resistant colorfast applications. In wood coating, the present compositions would provide stain resistance, mar resistance and block resistance between latex surfaces in storage. As to architectural coatings, the present composition would provide scrub resistance and other improved properties. In sealants, the present composition would provide adhesion to inorganic surfaces. As is clear to one of ordinary skill in the art, there is vast array of applications of the present invention in coating, sealant, adhesives, masonry sealers, fiberglass binders and sizes, inks and other water-borne polymer systems.

EXAMPLES

1. Preparation of a 40% β 3,4-epoxycyclohexyl) ethyltriethoxysilane (Silane A) emulsion with 5% surfactants—Into a beaker were added 3.85 grams of SPAN® 60 surfactant (ICI Americas) and 3.65 grams of TWEEN® 40 surfactant (ICI Americas) which were heated together in a hot water bath to melt the solid materials. 60.0 grams of Silane A were added and the mixture was stirred with a mechanical stirrer. 82.5 grams of water were added and the mixture was stirred vigorously for approximately five minutes to provide a white, stable emulsion containing 40% by weight of Silane A.

2. Preparation of a 20% Silane A emulsion with 5% surfactants—Into a beaker were added 3.5 grams of SPAN® 60 and 1.5 grams of TWEEN® 40 which were mixed and heated together in a hot water bath to melt the solid materials. 20.0 grams of Silane A were added and the mixture was stirred with a mechanical stirrer. 75.0 grams of water were added and the mixture was stirred vigorously for approximately five minutes to provide a white, stable emulsion containing 20% by weight of Silane A.

3. Preparation of a 40% Silane A emulsion with 8% surfactants—Into a beaker was added 2.18 grams of SPAN® 80 surfactant (ICI America) and 2.22 grams of TWEEN® 40 which were mixed together. To the surfactant mixture was added 22.0 grams of Silane A and the mixture was stirred with a mechanical stirrer. 28.6 grams of water were added and the mixture was stirred vigorously for approximately five minutes to provide a white, stable emulsion containing 40% by weight of Silane A.

4. Preparation of a 40% Silane A emulsion with 10% surfactants—Into a beaker was added 2.73 grams of SPAN® 80 and 2.77 grams of TWEEN® 40 which were mixed together. To the surfactant mixture was added 22.0 grams of Silane A and the mixture was stirred with a mechanical stirrer. 27.5 grams of water were added and the mixture was stirred vigorously for approximately five minutes to provide a white emulsion containing 40% by weight of Silane A.

5. Preparation of a 40% γ-glycidoxyropylmethyldiethoxysilane (Silane B) emulsion with 8% surfactants—1.93 grams of SPAN® 60 surfactant (ICI Americas) and 2.87 grams of Myrj® 52S surfactant (ICI Americas) were mixed together in a beaker and heated together in a hot water bath in order to melt the solid materials. 24.0 grams of Silane B were added and the mixture was stirred with a mechanical stirrer. 31.2 grams of water were added and the mixture was stirred for approximately thirty minutes to provide a white emulsion containing 40% by weight of Silane B. The epoxy silane emulsion was metastable and gelled within one month.

6. Preparation of 40% of γ-glycidoxypropyltri-(isobutoxy) silane (Silane D) with 6 weight percent surfactants—2.72 grams of SPAN® 60 surfactant and 1.18 grams of TWEEN® 40 were mixed together in a beaker and heated together in a hot water bath to melt the solid materials. 26.0 grams of D were added and the mixture was stirred with a Barhart Mixer for 20 minutes. 35.1 grams of water were added and the mixture was stirred for approximately thirty minutes to provide a white, stable emulsion containing 40% by weight of Silane D.

7. Preparation of 40% β-(3,4-epoxycyclohexyl)ethyl tri-(isobutoxy) silane (Silane E) emulsion with 6% surfactant—

2.36 gms of SPAN® 60 and 1.04 grams of TWEEN® 40 were mixed together in a beaker and heated together in a hot water bath to melt the solid material. 26.0 grams of Silane E were added and the mixture was stirred with a mechanical stirrer for 10 minutes. 35.1 grams of water were added and the mixture was stirred for approximately ten minutes. Giv-Gard DXN (Givaudan-Roure), a preservative, was added.

8–33. Preparation of stable epoxy silane containing compositions—Stable epoxy silane containing compositions were prepared by adding various amounts of precursor epoxy silane emulsion (i.e., Components I–III), as prepared according to procedures described in Examples 1–7 to varying amounts of acid modified polymer dispersions (Components III–IV) or emulsions (Components II–IV). The mixtures of precursor epoxy silane emulsions and acid modified polymer dispersions or emulsions were stirred for approximately 10 minutes. The descriptions and amounts of each component of stable epoxy silane compositions are reported in Table I. Comparative Examples I–XLIV—Comparative examples of epoxy silane acid modified polymer dispersions or emulsions were prepared by mixing various amounts of the epoxy silanes A–E and Z with varying amounts of commercially available acid modified polymer dispersions or emulsions. (see Table 1 for definition of silanes). The comparative example of alkylsilane U–W and diepoxy resin X were prepared by making an emulsion of the alkylsilanes or diepoxy resins according to procedures similar to those described in Examples 1–7, and then mixing various amounts of these alkyl silanes or diepoxy resin emulsions with varying amounts of commercially available acid modified polymer dispersions or emulsions. For example, the precursor diepoxy resin emulsion was prepared by charging into a beaker 2.44 grams of SPAN® 60 and 0.91 grams of MYRJ® 52S. The solids were melted by heating in a warm water bath with stirring. 18.2 grams of water were added to the mixture and stirred vigorously. 3.5 grams of 3,4 epoxycyclohexylmethyl 3,4 epoxycyclohexylcarboxylate (Union Carbide ERL-4221) were added and the mixture was stirred vigorously to yield a viscous paste. 28.7 grams of water were added and the stirring was continued for fifteen minutes to yield a white emulsion. The descriptions and amounts of each comparative example is reported in Table I.

TABLE I

Compositions of present invention (precursor epoxy emulsions and carboxylic acid modified polymers) and comparative examples.

| Example No. | Silane | % | Surfactant[1] | % | Polymer[2] | % | Water % |
|---|---|---|---|---|---|---|---|
| 8 | A | 0.198 | SPAN 60 | 0.035 | JONCRYL 554 | 46.53 | 53.22 |
|  |  |  | TWEEN 40 | 0.015 | (Acid No. 54) |  |  |
| 9 | A | 0.497 | SPAN 60 | 0.087 | JONCRYL 554 | 45.83 | 53.55 |
|  |  |  | TWEEN 40 | 0.037 |  |  |  |
| 10 | A | 0.998 | SPAN 60 | 0.175 | JONCRYL 554 | 44.66 | 54.09 |
|  |  |  | TWEEN 40 | 0.075 |  |  |  |
| 11 | A | 2.00 | SPAN60 | 0.192 | JONCRYL 554 | 44.65 | 52.97 |
|  |  |  | TWEEN 40 | 0.182 |  |  |  |
| 12 | A | 5.035 | SPAN 60 | 0.485 | JONCRYL 554 | 41.08 | 52.94 |
|  |  |  | TWEEN 40 | 0.459 |  |  |  |
| 13 | A | 0.497 | SPAN 60 | 0.087 | JONCRYL 540 | 42.91 | 56.47 |
|  |  |  | TWEEN 40 | 0.037 | (Acid No. 49) |  |  |
| 14 | A | 0.998 | SPAN 60 | 0.175 | JONCRYL 540 | 41.81 | 56.94 |
|  |  |  | TWEEN 40 | 0.075 |  |  |  |
| 15 | A | 5.035 | SPAN 60 | 0.485 | JONCRYL 540 | 38.46 | 55.56 |
|  |  |  | TWEEN 40 | 0.459 |  |  |  |
| 16 | A | 2.00 | SPAN 60 | 0.192 | JONCRYL 77 | 45.00 | 54.46 |
|  |  |  | TWEEN 40 | 0.182 | (Acid No. 55) |  |  |
| 17 | B | 2.00 | SPAN 60 | 0.161 | JONCRYL 77 | 43.70 | 53.90 |
|  |  |  | MYRJ 52S | 0.239 |  |  |  |
| 18 | A | 2.00 | SPAN 60 | 0.197 | JONCRYL 95 | 28.50 | 69.12 |
|  |  |  | TWEEN 40 | 0.182 |  |  |  |
| 19 | B | 2.00 | SPAN 60 | 0.161 | JONCRYL 95 | 28.5 | 69.10 |
|  |  |  | MYRJ 52S | 0.239 |  |  |  |
| 20 | A | 0.507 | SPAN 60 | 0.089 | SCX 2500 | 41.91 | 57.09 |
|  |  |  | TWEEN 40 | 0.038 | (Acid No. 19) |  |  |
| 21 | A | 1.013 | SPAN 60 | 0.172 | SCX 2500 | 40.82 | 57.92 |
|  |  |  | TWEEN 40 | 0.076 |  |  |  |
| 22 | A | 5.045 | SPAN60 | 0.486 | SCX 2500 | 37.58 | 56.43 |
|  |  |  | TWEEN 40 | 0.460 |  |  |  |
| 23 | A | 5.035 | SPAN 60 | 0.485 | JONCRYL 624 | 42.83 | 51.19 |
|  |  |  | TWEEN 40 | 0.459 | (Acid No. 50) |  |  |
| 24 | A | 5.035 | SPAN 60 | 0.485 | NEOREZ R-972 | 29.72 | 64.30 |
|  |  |  | TWEEN 40 | 0.459 | (Acid No. 13) |  |  |
| 25 | A | 5.035 | SPAN 60 | 0.485 | NEOREZ R-9679 | 32.34 | 61.68 |
|  |  |  | TWEEN 40 | 0.459 | (Acid No. 23) |  |  |
| 26 | A | 5.035 | SPAN 60 | 0.485 | UCAR Latex 100 | 54.20 | 39.83 |
|  |  |  | TWEEN 40 | 0.459 | (Acid No. 13) |  |  |
| 27 | A | 10.00 | SPAN 60 | 1.203 | UCAR Latex 100 | 47.24 | 40.42 |
|  |  |  | TWEEN 40 | 1.141 |  |  |  |
| 28 | A | 5.035 | SPAN 60 | 0.485 | UCAR Latex 154 | 52.45 | 41.57 |
|  |  |  | TWEEN 40 | 0.459 | (Acid No. 16) |  |  |
| 29 | A | 10.00 | SPAN 60 | 1.203 | UCAR Latex 154 | 45.71 | 41.95 |
|  |  |  | TWEEN 40 | 1.141 |  |  |  |
| 30 | A | 5.035 | SPAN 60 | 0.485 | UCAR Latex 163 | 50.70 | 43.32 |
|  |  |  | TWEEN 40 | 0.459 | (Acid No. 15) |  |  |

TABLE I-continued

Compositions of present invention (precursor epoxy emulsions and carboxylic acid modified polymers) and comparative examples.

| | | | | | | | |
|---|---|---|---|---|---|---|---|
| 31 | A | 10.00 | SPAN 60<br>TWEEN 40 | 1.203<br>1.141 | UCAR Latex 163 | 44.19 | 43.47 |
| 32 | B | 2.00 | SPAN 60<br>MYRJ 52S | 0.160<br>0.239 | JONCRYL 77 | 43.7 | 53.90 |
| 33 | B | 2.00 | SPAN 60<br>MYRJ 52S | 0.160<br>0.239 | JONCRYL 95 | 28.50 | 69.10 |

| Comparative Example | Additive | % | Surfactant | % | Polymer | % | Water % |
|---|---|---|---|---|---|---|---|
| I | NONE | | NONE | | JONCRYL 554 | 47.00 | 53.00 |
| II | NONE | | NONE | | SCX 2500 | 43.00 | 57.00 |
| III | NONE | | NONE | | JONCRYL 77 | 46.00 | 54.00 |
| IV | NONE | | NONE | | JONCRYL 540 | 44.00 | 56.00 |
| V | NONE | | NONE | | JONCRYL 95 | 30.00 | 70.00 |
| VI | X | 2.00 | SPAN 60<br>MYRJ 52S | 0.146<br>0.104 | JONCRYL 540 | 43.12 | 54.63 |
| VII | X | 2.00 | NONE | | JONCRYL 77 | 44.83 | 53.17 |
| VIII | A | 2.00 | NONE | | JONCRYL 77 | 44.83 | 53.17 |
| IX | Y | 2.00 | NONE | | JONCRYL 77 | 44.83 | 53.17 |
| X | C | 2.00 | NONE | | JONCRYL 77 | 44.83 | 53.17 |
| XI | B | 2.00 | NONE | | JONCRYL 77 | 44.83 | 53.17 |
| XII | Z | 2.00 | NONE | | JONCRYL 77 | 44.83 | 53.17 |
| XIII | U | 2.00 | ARQUAD 2C75<br>ARMEEN DMCD | 0.100<br>0.100 | JONCRYL 77 | 43.70 | 54.10 |
| XIV | V | 2.00 | SPAN 60<br>TWEEN 40 | 0.206<br>0.194 | JONCRYL 77 | 43.70 | 53.90 |
| XV | W | 2.00 | SPAN 60<br>TWEEN 40 | 0.206<br>0.194 | JONCRYL 77 | 43.77 | 53.90 |
| XVI | Y | 2.00 | NONE | | JONCRYL 95 | 29.40 | 68.60 |
| XVII | C | 2.00 | NONE | | JONCRYL 95 | 29.40 | 68.60 |
| XVIII | B | 2.00 | NONE | | JONCRYL 95 | 29.40 | 68.60 |
| XIX | X | 2.00 | NONE | | JONCRYL 95 | 29.40 | 68.60 |
| XX | Z | 2.00 | NONE | | JONCRYL 95 | 29.40 | 68.60 |
| XXI | X | 2.00 | SPAN 60<br>MYRJ 525 | 0.136<br>0.104 | JONCRYL 95 | 28.50 | 69.26 |
| XXII | A | 2.00 | NONE | | JONCRYL 95 | 29.40 | 68.60 |
| XXIII | U | 2.00 | ARQUAD 2C75<br>ARMEEN DMCD | 0.100<br>0.100 | JONCRYL 95 | 28.50 | 69.20 |
| XXIV | V | 2.00 | SPAN 60<br>TWEEN 40 | 0.206<br>0.194 | JONCRYL 95 | 28.50 | 69.10 |
| XXV | W | 2.00 | SPAN 60<br>TWEEN 40 | 0.206<br>0.194 | JONCRYL 95 | 28.50 | 69.10 |
| XXVI | A | 5.00 | NONE | | JONCRYL 624 | 46.55 | 48.45 |
| XXVII | Y | 5.00 | NONE | | JONCRYL 624 | 45.55 | 48.45 |
| XXVIII | A | 5.00 | NONE | | NEOREZ R-972 | 32.30 | 62.70 |
| XXIX | Y | 5.00 | NONE | | NEOREZ R-972 | 32.30 | 62.70 |
| XXX | A | 5.00 | NONE | | NEOREZ R-9679 | 35.15 | 59.85 |
| XXXI | Y | 5.00 | NONE | | NEOREZ R-9679 | 35.15 | 59.85 |
| XXXII | A | 5.00 | NONE | | UCAR Latex 100 | 58.90 | 36.10 |
| XXXIII | A | 10.00 | NONE | | UCAR Latex 100 | 55.80 | 34.20 |
| XXXIV | Y | 5.00 | NONE | | UCAR Latex 100 | 58.90 | 36.10 |
| XXXV | Y | 10.00 | NONE | | UCAR Latex 100 | 55.80 | 34.20 |
| XXXVI | A | 5.00 | NONE | | UCAR Latex 154 | 57.00 | 38.00 |
| XXXVII | A | 10.00 | NONE | | UCAR Latex 154 | 54.00 | 36.00 |
| XXXVIII | Y | 5.00 | NONE | | UCAR Latex 154 | 51.00 | 38.00 |
| XXXIX | Y | 10.00 | NONE | | UCAR Latex 154 | 54.00 | 36.00 |
| XL | A | 5.00 | NONE | | UCAR Latex 163 | 55.10 | 39.90 |
| XLI | A | 10.00 | NONE | | UCAR Latex 163 | 52.20 | 37.80 |
| XLII | Y | 5.00 | NONE | | UCAR Latex 163 | 55.10 | 39.90 |
| XLIII | Y | 10.00 | NONE | | UCAR Latex 163 | 52.20 | 37.80 |
| XLIV | X | 1.00 | SPAN 60<br>MYRJ 52S | 0.073<br>0.051 | JONCRYL 540 | 43.05 | 55.82 |

A = (3,4-epoxycyclohexyl)ethyltriethoxysilane
B = 3-glycidoxypropyldiethoxymethylsilane
C = 3-glycidoxypropyltriethoxysilane
D = 3-glycidoxypropyltri-(isobutoxy)silane
E = (3,4-epoxycyclohexyl)ethyltri-(isobutoxy)silane
U = octyltriethoxysilane
V = 1-triethoxysilyl-2-methyldiethoxysilylethane
W = amyltriethoxysilane
X = (3,4-epoxycyclohexylmethyl-3,4-epoxycyclohexylcarboxylate
Z = 3-glycidoxypropyltrimethoxysilane
[1]does not include the surfactants that may be in commercial acid modified polymer emulsion
[2]polymer weight is based upon solids in commercial products.

34–84.Shelf Life Stability—The shelf life stability of the stable epoxy silane emulsions containing acid modified polymer dispersions or emulsions containing acid modified polymer dispersions or emulsions (Components I–IV) and the comparative examples were determined by measuring the viscosity of these compositions at various times after preparation. The viscosity was visually monitored for flow properties by titling a bottle containing the compositions back and forth or by measuring the viscosity of the compositions at 25° C. using a Brookfield viscometer. The stabilities of the compositions are reported in Table II.

These examples show that the stable epoxy emulsions containing acid modified polymers (Components I–IV) are shelf stable for a period greater than 12 weeks provided that the pH of the composition is relatively neutral. For example, Example 27 has 10 weight percent Silane A and UCAR latex 100 and at a pH=6, had a viscosity of 1300 cP after storing at room temperature for 12 weeks. The compositions of comparative examples XXXIII and XXXV, where 10 percent of the Silane A was simply mixed with UCAR latex 100 showed an increase in viscosity, as shown in Examples 38 and 39, respectively. Comparative example XXXIII had an increase in viscosity to 3000 cP after storing at room temperature for 12 weeks. Comparative example XXXV gelled within 12 weeks.

The shelf life of the stable epoxy emulsions is important to the end use properties. For example, compositions described in Example 24 were stable for a period of 12 weeks and form a film with a smooth surface upon drying as shown in Example 67. Comparative Example XXVIII, although it did not show a change in viscosity after 12 weeks, produced a poor quality film, as shown in Example 68. This film had a cracked surface and fish eyes. The source of the surface defects was attributed to the hydrolysis and condensation of the epoxy silane to form microgels and oils.

The pH of the compositions can have a pronounced effect on the stability of the compositions. For example, the viscosity of compositions set forth by Example 22 gradually increased and finally gelled after 24 weeks, as shown in Example 75. The increase in viscosity was attributed to the alkalinity of the composition. The pH of the composition was 8.6. These compositions may be useful as a two-component system where long pot time is required.

The stability of Example 32 was observed to be poor, as shown in Example 53. Silane B is slightly soluble in water and the water solubility of this silane makes the preparation of a stable precursor epoxy emulsion difficult. The precursor epoxy silane emulsion described in Example 3 gelled within one month. Lowering the water solubility of Silane B by changing the alkoxy groups attached to the silicon atom can significantly improve the stability of the precursor epoxy silane emulsion. For example, the precursor silane emulsion described in Example 6 was stable. Of note, Silane D is insoluble in water.

TABLE II

Data showing that the compositions of present invention (I–IV) form more stable mixtures than simple addition of epoxy silane or additive to aqueous emulsion or dispersion of an acid modified polymers and produce good film quality. The table also shows the effect of pH on the stability of the compositions of the present invention.

| | | | Viscosity of mixture (visual observation or measured viscosity in cP at 25° C.) after storage at room temperature for various periods of time (weeks) | | | | | | |
|---|---|---|---|---|---|---|---|---|---|
| Example No | Cmpstn | pH level | 0 | 1 | 2 | 4 | 12 | 24 | Film Quality |
| 34 | 26 | 6.0 | Thin | | Thin | | | | |
| 35 | XXXII | 6.0 | Thin | | Thick | | | | |
| 36 | XXXIV | 6.0 | Thin | | Thick | | | | |
| 37 | 27 | 6.0 | Thin | | | | 1300 | | |
| 38 | XXXIII | 6.0 | Thin | | | | 3000 | | |
| 39 | XXXV | 6.0 | Thin | | | | gel | | |
| 40 | 28 | 4.0 | Thin | | Thin | | | | |
| 41 | XXXVI | 4.0 | Thin | | Thick | | | | |
| 42 | XXXVIII | 4.0 | Thin | | Thick | | | | |
| 43 | 29 | 4.0 | Thin | | | | 1100 | | |
| 44 | XXXVII | 4.0 | Thin | | | | 1700 | | |
| 45 | XXXIX | 4.0 | Thin | | | | 2000 | | |
| 46 | 30 | 4.0 | Thin | | Thin | | | | |
| 47 | XL | 4.0 | Thin | | Thick | | | | |
| 48 | XLII | 4.0 | Thin | | Thick | | | | |
| 49 | 31 | 4.0 | Thin | | | | 1000 | | |
| 50 | XLI | 4.0 | Thin | | | | 1300 | | |
| 51 | XLIII | 4.0 | Thin | | | | 1500 | | |
| 52 | 16 | 8.5 | Thin | | Thin | | | | Smooth surface |
| 53 | 32 | 8.5 | Thin | | Gel | | | | Smooth surface |
| 54 | IX | 8.5 | Thin | | Thin | | | | Smooth surface |
| 55 | X | 8.5 | Thin | Gel | | | | | Smooth Surface |
| 56 | XI | 8.5 | Thin | | Gel | | | | Smooth Surface |
| 57 | VI | 8.5 | Thin | | | Gel | | | Smooth Surface |
| 58 | 18 | 8.5 | Thin | | | Thin | | | Smooth Surface |
| 59 | 33 | 8.5 | Thin | | | Separate into 2 layers | | | Smooth Surface |
| 60 | XVI | 8.5 | Thin | | | Thin | | | Cratered Surface |
| 61 | XVII | 8.5 | Thin | | | Thin | | | Smooth Surface |
| 62 | XVIII | 8.5 | Thin | | | Thin | | | Cratered Surface |
| 63 | XXI | 8.5 | Thin | | | Separated into 2 layers | | | Smooth surface |
| 64 | 23 | 8.0 | Thin | | | Thick | | | Smooth surface |

TABLE II-continued

Data showing that the compositions of present invention (I–IV) form more stable mixtures than simple addition of epoxy silane or additive to aqueous emulsion or dispersion of an acid modified polymers and produce good film quality. The table also shows the effect of pH on the stability of the compositions of the present invention.

| | | | Viscosity of mixture (visual observation or measured viscosity in cP at 25° C.) after storage at room temperature for various periods of time (weeks) | | | | | | |
|---|---|---|---|---|---|---|---|---|---|
| Example No | Cmpstn | pH level | 0 | 1 | 2 | 4 | 12 | 24 | Film Quality |
| 65 | XXVI | 8.0 | Thin | | Gel | | | | Gel particles & cratered |
| 66 | XXVII | 8.0 | Thin | | | Thick | | | Rough, cratered surface |
| 67 | 24 | 8.0 | Thin | | | Thin | | | Smooth Surface |
| 68 | XXVIII | 8.0 | Thin | | | Thin | | | Fish eyes, cracked surface |
| 69 | XXIX | 8.0 | Thin | | | Thin | | | Cratered surface |
| 70 | 25 | 8.0 | Thin | | | Thin | | | Smooth surface |
| 71 | XXX | 8.0 | Thin | | | Thin | | | Fish eyes |
| 72 | XXXI | 8.0 | Thin | | | Thick | | | Fish eyes |
| 73 | 20 | 8.5 | 50 | 49 | 50 | | | 63 | |
| 74 | 21 | 8.5 | 65 | 62 | 64 | | | 75 | |
| 75 | 22 | 8.6 | 148 | 146 | 107 | | | gel | |
| 76 | II | 8.5 | 28 | 30 | 29 | | | 45 | |
| 77 | 13 | 8.6 | 28 | 30 | 29 | | | 400 | |
| 78 | 14 | 8.6 | 135 | 154 | 192 | | | 440 | |
| 79 | 15 | 8.6 | 149 | 260 | 913 | | | gel | |
| 80 | IV | 8.6 | 228 | 206 | 208 | | | 240 | |
| 81 | 9 | 8.4 | 924 | 396 | 493 | | | 260 | |
| 82 | 10 | 8.5 | 234 | 378 | 500 | | | 930 | |
| 83 | 12 | 8.5 | 193 | 860 | 5675 | | | gel | |
| 84 | I | 8.5 | 4.13 | 397 | 423 | | | 520 | |

85–111. Solvent Resistance—The stable epoxy silane emulsions containing acid modified polymers are useful in improving the solvent resistance of films cast from them. The solvent resistance was determined by methyl ethyl ketone (MEK) double rubs. The tests were conducted according to ASTM D4752-87. Films were cured at 23° C. and 50% relative humidity for seven days or cured at 121° C. for 20 minutes and then 23° C. at 50% relative humidity for 7 days. The results of solvent resistance is reported in Table III.

The solvent resistance of films cast from compositions of the present invention was significantly better than films cast from the acid modified polymers alone. For example, the number of MEK double rubs of a film cast from compositions described in Example 16 and shown in Example 90 and cured at 121° C. for 20 minutes was 130 rubs. Comparative Example III, a film of JONCRYL 77 withstood only 11 MEK rubs, as shown in Example 91. Simple mixtures of Silane A and JONCRYL 77, Comparative Example VIII, withstood only 34 rubs. In some cases, simple blends of epoxy silanes and polymers, such as Comparative Example XI, yield solvent resistant films shown in Example 94, but the shelf life of these compositions is poor. For example, Comparative Example XI gelled in two weeks, as shown in Example 56/

TABLE III

Data showing that the compositions of present invention have improved solvent resistance, as demonstrated by MEK double rubs

| | | MEK double rubs | |
|---|---|---|---|
| Example No. | Composition | Cured at 23° C. at 50% relative humidity for 7 days 23° C. | Cured at 121° C. for 20 min and then at 50% relative humidity for 7 days |
| 85 | 8 | 29 | 39 |
| 86 | 9 | — | 40 |
| 87 | 10 | 26 | — |
| 88 | 11 | — | 50 |
| 89 | I | 14 | 9 |
| 90 | 16 | 41 | 130 |
| 91 | III | 14 | 11 |
| 92 | IX | 41 | 169 |
| 93 | XII | 110 | 171 |
| 94 | XI | 87 | 127 |
| 95 | VI | 8 | 9 |
| 96 | VII | | 45 |
| 97 | VIII | | 34 |
| 98 | XIII | — | 11 |
| 99 | XIV | — | 9 |
| 100 | XV | — | 9 |
| 101 | 18 | 19 | 182 |
| 102 | V | 8 | 7 |
| 103 | XVI | 2 | 22 |
| 104 | XX | 57 | 241 |
| 105 | XVIII | — | 22 |
| 106 | XXI | 12 | 22 |
| 107 | XIX | — | 46 |
| 108 | XXII | — | 51 |
| 109 | XXIII | — | 14 |

TABLE III-continued

Data showing that the compositions of present
invention have improved solvent resistance, as
demonstrated by MEK double rubs

|  |  |  | MEK double rubs |
|---|---|---|---|
| 110 | XXIV | — | 13 |
| 111 | XXV | — | 8 |

1. Film had craters.

112–115. Mar Resistance. The compositions of the present invention have improved mar resistance when cast as films. The mar resistance was measured using an AATCC crockmeter, Atlas Electric Devices Company, model CM-5. Films were cast into Bonderite treated cold-rolled steel panels using a draw down bar and cured at 121° C. for 20 minutes and 23° C. and 50% relative humidity for seven days. The gloss values were determined according to ASTM D 523. The results of the mar resistance of these films are reported in Table IV. Films cast from compositions of the present invention demonstrated an improvement in mar resistance for compositions freshly prepared and aged 6 months (Examples 112 and 113) as compared to compositions from Comparative Examples XLIV and IV (Examples 114 and 115).

TABLE IV

Data showing that the mar resistance of films
cast from compositions of present inventions are better
than simple mixture of epoxy silane and acid modified polymers

| Example No. | Composition | Initial Gloss (60°) | Gloss after 10 cycles | % loss |
|---|---|---|---|---|
| 112 | 14[1] | 96 | 32 | 67 |
| 113 | 14[2] | 100 | 50 | 50 |
| 114 | XLIV | 98 | 26 | 73 |
| 115 | IV | 103 | 24 | 77 |

[1]film cast immediately after preparation of composition
[2]film cast 6 months after preparation of composition.

116–125. Hardness—Films cast from the compositions of the present invention had an increase in hardness while maintaining other film properties, such as gloss, and adhesion, as indicated in Table V. Pencil hardness was measured according to ASTM D 3363-74. The gloss was measured according to ASTM-D 523. Crosscut tape adhesion was measured according to ASTM 3359-90. Wet adhesion of the film to E-coat steel panel was measured according to Method 6301 of US Federal Standard Test Method 141B. The films were prepared using a draw down bow. The dry film thickness was 2 mils. The films were cured at 121° C. for 20 minutes and 23° C. and 50% relative humidity for 7 days.

TABLE V

Data showing that composition of present invention
give a good balance of film properties after curing at
121° C. for 2 minutes and 23° for 7 days

| Example | Composition | Gloss value 20° | Gloss value 60° | Hardness Pencil | Tape Adhesion | Wet Adhesion |
|---|---|---|---|---|---|---|
| 116 | 16 | 84 | 97 | HB | 5B | 10 |
| 117 | 17 | 78 | 99 | H | 5B | 10 |
| 118 | XII | 64 | 92 | F | 5B | 10 |
| 119 | VI | 80 | 99 | B | 5B | 10 |
| 120 | III | 89 | 105 | B | 5B | 10 |
| 121 | 18 | 80 | 94 | 2H | 5B | 10 |
| 122 | 19 | 64 | 92 | F | 5B | 10 |
| 123 | XX | 80 | 99 | HB | 5B | 10 |
| 124 | XXI | 80 | 99 | HB | 5B | 10 |
| 125 | V | 96 | 107 | B | 5B | 10 |

A dramatic illustration of the usefulness of the composition of the present invention is presented for a filled latex sealant. The sealant formulations are set forth in Table VI. The sealants were prepared by charging UCAR latex polymer 105 and TRITON X-405 into a mixing vessel and stirring for five minutes. A solution of NUOCEPT 95 preservative, TRITON X-405 surfactant and water was added to the mixing vessel and stirred for five minutes. The ethylene glycol, TEMOL 850 dispersing agent, ASE 60 thickener, KTPP potassium tripolyphosphate, and SANTICISER 160 plasticizer were added and mixed using a high speed mixing propeller. Mineral spirits, precursor epoxy silane emulsion or silicone additive and ammonium hydroxide were added and mixed using a spatula. A MOLTINI PLANAMAX mixer was used to stir the mixture for 20 minutes under a nitrogen atmosphere. The $TiO_2$ and DMDEE (2,2-dimorpholino diethyl ether) catalysts were added and mixed for five minutes. The mixture was degassed under reduced pressure for five minutes. The sealant was stored in a plastic sealant tube.

The sealants were cured at 23° C. and 50% relative humidity for three weeks in an environmental chamber and 1 week at ambient conditions. The physical properties of the cured sealants were measured according to ASTM D 412C (percent elongation, tensile strength and modulus), ASTM 624 (tear strength), C-661 (shore A hardness) and C-794 (adhesion in peel).

The sealants were heat aged at 50° C. for 4 weeks. The physical properties of the sealant are reported in Table VI. The compositions of the present invention, when fully formulated into a filled acrylic latex (Example 129), had excellent adhesion while maintaining high elongation and low modulus, especially after aging for 4 weeks at 50° C. The comparative examples 126–28, 130–31 had either poor adhesion after heat aging or dramatic loss of percent elongation.

TABLE VI

Data showing that the compositions of the present invention
give a good balance of properties in a filled latex selant

LATEX SEALANT FORMULATIONS

1. FILLED FORMULATION

| Components | Parts | Source |
|---|---|---|
| UCAR ® Latex Polymer 105 | 200.00 | Union Carbide |
| TRITON ® X-405 (70% Active Surfactant) | 3.45 | Union Carbide |
| NUOSEPT ® 95 (Preservative) | 0.50 | Huls |
| TRITON ® X-405 | 0.50 | Union Carbide |
| Distilled Water | 0.50 |  |
| Ethylene Glycol | 4.95 | Aldrich |

TABLE VI-continued

Data showing that the compositions of the present invention give a good balance of properties in a filled latex selant

LATEX SEALANT FORMULATIONS

1. FILLED FORMULATION

| Components | Parts | Source |
|---|---|---|
| TEMOL ® 850 (Dispersing Agent) | 0.50 | Rohm & Haas |
| ASE ® 60 (Thickener) | 4.00 | Rohm & Haas |
| KTPP (Potassium Tripolyphosphate) | 0.50 | FMC |
| SANTICISER ® 160 (Plasticizer) | 50.00 | Monsanto |
| Mineral Spirits | 4.00 | Aldrich |
| Organofunctional Silane or precursor epoxy emulsion | 2.00 | OSi Specialties |
| Ammonium Hydroxide (28% Soln) | 1.00 | Fisher |
| DRIKALITE ® (Treated Calcium Carbonate) | 230.00 | ECC |
| Titanium Dioxide R-901 | 4.00 | DuPont |
| DMDEE (Catalyst) | 0.50 | Texaco |

Amine catalysts identified by product name are:

| | |
|---|---|
| Anquamide 360 (Air Products) | Polyethylene polyamine, polyamide solution |
| Anquamine 401 (Air Products) | Tetraethylene pentamine |
| EMI-24 (Air Products) | 2-Ethyl-4-methyl-1H-imidazole |
| DMP-30 and DY-064 (Ciba, now Novartis) | Tris-2,4,6-(dimethylamino-methyl)phenol |
| BMDA and DY-062 (Ciba, now Novartis) | N-Benzyl-N-dimethylamine |
| PE-1013 (ELF Atochem) | Dibutyltin bis(1-thioglycerol) |

Sample Description: Latex X+1% [14.89% Anquamide 360/water]+3% of 40% emulsion of Silane "Y–1" (β-[3,4-epoxycyclohexyl]-ethyl triethoxysilane)

PHYSICAL PROPERTIES[a] FOR FILLED ACRYLIC LATEX SEALANT FORMULATION

| Example | Silane | Elongation % | Tensile (psi) | Modulus (Young's) | Tear (lbs/in) | Hardness (Shore A) | Adhesion to Anodized Aluminum (lbs/in) | Cohesive Failure Mode (%) |
|---|---|---|---|---|---|---|---|---|
| 126 | None | | | | | | | |
| | Initial | 400 | 44.8 | 43.3 | 19.7 | 6 | 8.1 | 65% |
| | Aged[b] | 347 | 41.2 | 29.0 | 20.1 | 15 | 9.5 | 10 |
| 127 | Z | | | | | | | |
| | Initial | 287 | 62.4 | 39.3 | 22.9 | 20 | 7.2 | 95% |
| | Aged | 158 | 110.6 | 119.4 | 30.1 | 15 | 5.8 | 98% |
| 128 | A | | | | | | | |
| | Initial | 300 | 72.6 | 36.2 | 26.6 | 23 | 4.4 | 100% |
| | Aged | 70 | 116.3 | 313.8 | 16.4 | 16 | 3.4 | 100% |
| 129 | Example 1 | | | | | | | |
| | Initial | 300 | 73.3 | 41 | 36.5 | 15 | 7.7 | 93% |
| | Aged | 199 | 82.5 | 60.6 | 29.1 | 22 | 11.2 | 90% |
| 130 | W | | | | | | | |
| | Initial | 567 | 27.4 | 9.3 | 9.3 | 15 | 5.1 | 20% |
| | Aged | 200 | 125.3 | 25.5 | 25.5 | 24 | 7.5 | 7% |
| 131 | T | | | | | | | |
| | Initial | 253 | 53.2 | 26.9 | 26.9 | 28 | 9.1 | 100% |
| | Aged | 219 | 39.1 | 20.2 | 20.2 | 21 | 8.0 | 20% |

[a]Physical properties measurements obtained in accordance with accepted ASTM test specifications;
[b]Samples were aged for four (4) weeks at 50° C.;
A = (3,4-epoxycyclohexyl)ethyltriethoxysilane
T = 3-aminopropylsiloxanes in water
Z = 3-glycidoxypropyltrimethoxysilane
Example 1. Precursor epoxy silane emulsion prepared in Example 1
W = amyltriethoxysilane. (The silane was added as an emulsion prepared by mixing 40 grams of amyltriethoxysiloxane, 4.11 grams of SPAN60 and 3.87 grams of TWEEN 40 and 52 grams of water.)

EXAMPLES USING AMINE CATALYSTS

The following examples demonstrate the very satisfactory and superior results obtained when an amine catalyst is present in the composition, in accordance with the present invention.

The tests were carried out using either a commercially available styrene acrylic latex sealer/topcoat with an acid number of 10.7, termed "Latex X" hereinafter, or "Rhoplex CL-204" (Rohm & Haas), both of which are commercial acrylic latexes with pendant carboxylic groups.

In each test, the components indicated were combined, the resulting composition was cured, and the properties of the cured product were determined 4 hours, 3 days, and 7 days later. The test procedures were as described hereinabove.

| SAMPLES | pH |
|---|---|
| Latex X | 6.78 |
| 14.89% Anquamide 360/water. | 9.33 |
| Latex X + 1% of [14.89% Anquamide 360/Water]. | 7.9 |
| Latex X + 1% of [4.89% Anquamide 360/water + 3% of 40% Y-1 emulsion. | 7.81 |
| 1% of 14.89% Anquamide 360/water was added with 1.74% Dowanol PnB to Latex X [No gel particles were present] | |

-continued

CURING CYCLE FOR COATED PANELS 15 min.
baked @ 150° F., Cured for:

| | | CURING TIME AT AMBIENT TEMP. | | |
|---|---|---|---|---|
| | | .17 day | 3 days | 7 days |
| Print Resistance Test | | | | |
| at 50° C. for 2 hr. | 2 lb | 2 | 8 | 9 |
| | 4 lb | 2 | 8 | 7 |
| At Room Temp. [4 hr.] | 2 lb | 10 | 10 | 10 |
| | 4 lb | 10 | 10 | 10 |
| Pencil Hardness | | 2B | HB | B |
| Methyl Ethyl Ketone Resistance Test [Double Rubs] | | 31 | 76 | 181 |
| Coating Thickness [mils.] | | 1.3 | 1.8 | 1.9 |

Sample Description: Latex X+1% [28.89% Anquamine 401/water]+3% of 40% Y-1 emulsion

| SAMPLES | pH |
|---|---|
| Latex X | 6.78 |
| Latex X + 1% Anquamine 401 | 8.47 |
| Latex X + 1% Anquamine 401 + 3% of 40% Y-1 emulsion | 8.55 |

CURING CYCLE FOR COATED PANELS: 15 min.
baked @ 150° F., Cured for :

| | | CURING TIME AT AMBIENT TEMP. | | |
|---|---|---|---|---|
| | | .17 day | 3 days | 7 days |
| Print Resistance Test | | | | |
| At 50° C. for 2 hr. | 2 lb. | 5 | 9 | 9 |
| | 4 lb. | 2 | 9 | 7 |
| At Room Temp. [4 hr.] | 2 lb. | 10 | 10 | 10 |
| | 4 lb. | 10 | 10 | 10 |
| Pencil Hardness | | HB | HB | HB |
| Methyl Ethyl Ketone Resistance Test [Double Rubs] | | 21 | 61 | >400 |
| Coating Thickness [mils.] | | 1.5 | 1.8 | 1.9 |

Sample Description: Latex X+1% EMI-24+3% of 40% Y-1 emulsion.

| SAMPLES | pH |
|---|---|
| Latex X | 6.78 |
| Latex X + 1% EMI-24 | 8.97 |
| Latex X+ 1% EMI-24 + 3% of 40% Y-1 emulsion | 8.91 |

-continued

CURING CYCLE FOR COATED PANELS: 15 min.
baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 6 | 9 | 9 |
| | 4 lb. | 3 | 8 | 9 |
| At Room Temp. [4 hr.] | 2 lb. | 10 | 10 | 10 |
| | 4 lb. | 10 | 10 | 10 |
| Pencil Hardness | | 2B | F | F |
| Methyl Ethyl Ketone Resistance Test [Double Rubs] | | 72 | 241 | >400 |
| Coating Thickness [mils.] | | 1.3 | 1.8 | 1.9 |

Sample Description: Latex X+1% Ethyltriphenylphosphinium Bromide+3% of 40% Y-1 emulsion.

| SAMPLES | pH |
|---|---|
| Latex X | 6.78 |
| Latex X + 1% Ethyltriphenylphosphonium Bromide | 6.48 |
| Latex X + 1% Ethyltriphenylphosphonium Bromide + 3% of 40% Y-1 emulsion. | 6.51 |

CURING CYCLE FOR COATED PANELS: 15 min.
baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 7 | 7 | 7 |
| | 4 lb. | 7 | 7 | 7 |
| At Room Temp. [4 hr.] | 2 lb. | 10 | 10 | 10 |
| | 4 lb. | 9 | 10 | 10 |
| Pencil Hardness | | 3B | B | 2B |
| Methyl Ethyl Ketone Resistance Test [Double Rubs] | | 38 | 56 | 171 |
| Coating Thickness [mils.] | | 1.7 | 1.5 | 1.8 |

Sample Description: Latex X+1% DMP-30+% of 40% Y-1 emulsion.

| SAMPLES | pH |
|---|---|
| Latex X | 6.78 |
| Latex X + 1% DMP-30 | 9.65 |
| Latex X + 1% DMP-30 + 3% of 40% Y-1 emulsion. | 9.6 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 7 | 5 | 5 |
| | 4 lb. | 3 | 3 | 3 |
| At Room Temp. [4 hr.] | 2 lb. | 10 | 10 | 10 |
| | 4 lb. | 9 | 10 | 10 |
| Pencil Hardness | | 3B | 2B | 3B |
| Methyl Ethyl Ketone Resistance Test [Double Rubs] | | 32 | 78 | 128 |
| Coating Thickness [mils.] | | 1.9 | 1.05 | 1.8 |

Sample Description: Latex X+1% BMDA+3% of 40% Y-1 emulsion.

| SAMPLES | pH |
|---|---|
| Latex X | 6.78 |
| Latex X + 1% BMDA | 8.69 |
| Latex X + 1% BMDA + 3% of 40% Y-1 emulsion. | 8.69 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 6 | 7 | 5 |
| | 4 lb. | 3 | 7 | 7 |
| At Room Temp. [4 hr.] | 2 lb. | 10 | 10 | 10 |
| | 4 lb. | 10 | 10 | 10 |
| Pencil Hardness | | 3B | B | B |
| Methyl Ethyl Ketone Resistance Test [Double Rubs] | | 26 | 78 | 102 |
| Coating Thickness [mils.] | | 1.6 | 1.9 | 1.9 |

Sample Description: Latex X+1% (Butyl) triphenylphosphonium Bromide+3% of 40% Y-1 emulsion

| SAMPLES | pH |
|---|---|
| Latex X | 6.78 |
| Latex X + 1% (Butyl)triphenylphosphonium Bromide | 8.38 |
| Latex X + 1% (Butyl)triphenylphosphonium Bromide + 3% of 40% Y-1 emulsion | 6.44 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 4 | 7 | 8 |
| | 4 lb. | 3 | 7 | 8 |
| At Room Temp. [4 hr.] | 2 lb. | 10 | 10 | 10 |
| | 4 lb. | 9 | 10 | 10 |
| Pencil Hardness | | 3B | 2B | B |
| Methyl Ethyl Ketone Resistance Test [Double Rubs] | | 38 | 140 | 157 |
| Coating Thickness [mils.] | | 1.8 | 1.9 | 1.8 |

Sample Description: Latex X+1% Benyltrimethylammonium Chloride+3% of 40% Y-1 emulsion.

| SAMPLES | pH |
|---|---|
| Latex X | 6.78 |
| Latex X + 1% Benzyltrimethylammonium Chloride | 6.49 |
| Latex X + 1% Benzyltrimethylammonium Chloride + 3% of 40% Y-1 emulsion | 6.52 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 4 | 7 | 7 |
| | 4 lb. | 1 | 5 | 5 |
| At Room Temp. [4 hr.] | 2 lb. | 9 | 10 | 10 |
| | 4 lb. | 8 | 10 | 10 |
| Pencil Hardness | | >5B | 4B | 2B |
| Methyl Ethyl Ketone Resistance Test [Double Rubs] | | 25 | 28 | 29 |
| Coating Thickness [mils.] | | 1.8 | 2 | 1.7 |

Sample Description: Latex X+0.2% Tin [II] Chloride+3% of 40% Y-1 emulsion.

| SAMPLES | pH |
|---|---|
| Latex X | 6.68 |
| Latex X + 0.2% Tin [II] Chloride. | 3.89 |
| Latex X + 0.2% Tin [II] Chloride + 3% of 40% Y-1 emulsion | 3.95 |

CURING CYCLE: 15 min. baked @ 150° F., Cured for:

| | | CURING TIME | | |
|---|---|---|---|---|
| | | .17 day | 3 days | 7 days |
| Print Resistance Test | | | | |
| At 50° C. for [2 hr.] | 2 lb. | 7 | 6 | 6 |
| | 4 lb. | 3 | 3 | 5 |
| At Room Temp. [4 hr.] | 2 lb. | 10 | 10 | 10 |
| | 4 lb. | 10 | 10 | 10 |

| -continued | | | |
|---|---|---|---|
| Pencil Hardness | B | HB | HB |
| Methyl Ethyl Ketone Resistance Test [Double Rubs] | 38 | 35 | 43 |
| Coating Thickness [mils.] | 1.8 | 1.3 | 1.1 |

Sample Description: Latex X+1% of 50% Accelerator DY 062/water+3% of 40% Y-1 emulsion

| SAMPLES | pH |
|---|---|
| Latex X | 6.78 |
| 50% Accelerator DY-062/water [Insoluble] | 10.9 |
| 50% Accelerator DY-062/water + 20% Acetic acid [Soluble]. | 7.45 |
| Latex X + 1% of 50% Accelerator DY 062/water/Acetic acid | 6.43 |
| Latex X + 1% of 50% Accelerator DY 062/water/Acetic acid + 3% of 40% Y-1 emulsion | 6.5 |

CURING CYCLE: 15 min. baked @ 150° F., Cured for:

| | | CURING TIME | | |
|---|---|---|---|---|
| | | .17 day | 3 days | 7 days |
| Print Resistance Test | | | | |
| At 50° C. for [2 hr.] | 2 lb. | 4 | 5 | 6 |
| | 4 lb. | 4 | 1 | 5 |
| At Room Temp. [4 hr.] | 2 lb. | 9 | 10 | 10 |
| | 4 lb. | 9 | 10 | 10 |
| Pencil Hardness | | 2B | 2B | B |
| Methyl Ethyl Ketone Resistance Test [Double Rubs] | | 49 | 52 | 72 |
| Coating Thickness [mils.] | | 1.8 | 1.3 | 1.6 |

Sample Description: Latex X+1% of 25% Fomrez UL-22 emulsion+3% of 40% Y-1 emulsion

| SAMPLES | pH |
|---|---|
| Latex X | 6.78 |
| 25% Fomrez UL-22 emulsion [25% Fomrez UL-22 + 35.5% Igepal CA-897 (Non Ionic surfactant) + 39.5% water. | 6.23 |
| Latex X + 1% of 25% Fomrez UL-22 emulsion. | 6.84 |
| Latex X + 1% of 25% Fomrez UL-22 emulsion + 3% of 40% Y-1 emulsion | 6.75 |

CURING CYCLE: 15 min. baked @ 150° F., Cured for:

| | | CURING TIME | | |
|---|---|---|---|---|
| | | .17 day | 3 days | 7 days |
| Print Resistance Test | | | | |
| At 50° C. for [2 hr.] | 2 lb. | 4 | 7 | 8 |
| | 4 lb. | 2 | 3 | 6 |
| At Room Temp. [4 hr.] | 2 lb. | 10 | 10 | 10 |
| | 4 lb. | 10 | 10 | 10 |
| Pencil Hardness | | 3B | 2B | B |
| Methyl Ethyl Ketone Resistance Test [Double Rubs] | | 59 | 114 | 130 |
| Coating Thickness [mils.] | | 1.9 | 1.7 | 1.7 |

Sample Description: Latex X+1% of 25% PE-1013 [Tin catalyst] emulsion+3% of 40% Y-1 emulsion

| SAMPLES | pH |
|---|---|
| Latex X | 6.78 |
| 25% PE-1013 emulsion [25% PE-1013 (Tin catalyst) + 35.5% Igepal CA-897 (non Ionic surfactant) + 39.5% water. | 6.61 |
| Latex X + 1% of 25% PE-1013 emulsion. | 6.86 |
| Latex X + 1% of 25% PE-1013 emulsion + 3% of 40% Y-1 emulsion | 6.86 |

CURING CYCLE: 15 min. baked @ 150° F., Cured for:

| | | CURING TIME | | |
|---|---|---|---|---|
| | | .17 day | 3 days | 7 days |
| Print Resistance Test | | | | |
| At 50° C. for [2 hr.] | 2 lb. | 2 | 5 | 5 |
| | 4 lb. | 2 | 2 | 4 |
| At Room Temp. [4 hr.] | 2 lb. | 10 | 10 | 10 |
| | 4 lb. | 9 | 10 | 10 |
| Pencil Hardness | | 2B | 2B | B |
| Methyl Ethyl Ketone Resistance Test [Double Rubs] | | 65 | 69 | 278 |
| Coating Thickness [mils.] | | 1.8 | 1.5 | 2.1 |

Sample Description: Latex X+0.5% Dowanol PnB.[Control]

| SAMPLES | pH |
|---|---|
| Latex X + 0.5% Dowanol PnB. | 6.78 |

CURING CYCLE: 15 min. baked @ 150° F., Cured for:

| | | CURING TIME | | |
|---|---|---|---|---|
| | | .17 day | 3 days | 7 days |
| Print Resistance Test | | | | |
| At 50° C. for [2 hr.] | 2 lb. | 9 | 10 | 10 |
| | 4 lb. | 9 | 10 | 10 |
| At Room Temp. [4 hr.] | 2 lb. | 10 | 10 | 10 |
| | 4 lb. | 10 | 10 | 10 |
| Pencil Hardness | | HB | B | HB |
| Methyl Ethyl Ketone Resistance Test [Double Rubs] | | 28 | 27 | 28 |
| Coating Thickness [mils.] | | 1.1 | 1.3 | 1.7 |

Sample Description: Latex X+3% of 40% Y-1 emulsion

| SAMPLES | pH |
|---|---|
| Latex X | 6.78 |
| Latex X + 3% of 40% Y-1 emulsion. | 6.94 |

-continued

| CURING CYCLE: 15 min. baked @ 150° F., Cured for: | | | | |
|---|---|---|---|---|
| | | CURING TIME | | |
| | | .17 day | 3 days | 7 days |
| Print Resistance Test | | | | |
| At 50° C. for [2 hr.] | 2 lb. | 5 | 5 | 10 |
| | 4 lb. | 1 | 1 | 9 |
| At Room Temp. [4 hr.] | 2 lb. | 10 | 10 | 10 |
| | 4 lb. | 9 | 10 | 10 |
| Pencil Hardness | | 2B | 2B | F |
| Methyl Ethyl Ketone Resistance Test [Double Rubs] | | 32 | 40 | 46 |
| Coating Thickness [mils.] | | 1.7 | 1.4 | 1.2 |

Sample Description: Latex X+1% DY 064 [catalyst]+3% of 40% Y-1 emulsion

| SAMPLES | pH |
|---|---|
| Latex X | 6.68 |
| Latex X + 1% DY 064 [catalyst]. | 9.48 |
| Latex + 1% DY 064 + 3% of 40% Y-1 emulsion. | 9.39 |

| CURING CYCLE: 15 min. baked @ 150° F., Cured for: | | | | |
|---|---|---|---|---|
| | | CURING TIME | | |
| | | .17 day | 3 days | 7 days |
| Print Resistance Test | | | | |
| At 50° C. for [2 hr.] | 2 lb. | 6 | 5 | 3 |
| | 4 lb. | 1 | 1 | 2 |
| At Room Temp. [4 hr.] | 2 lb. | 9 | 10 | 10 |
| | 4 lb. | 9 | 10 | 10 |
| Pencil Hardness | | 2B | 2B | HB |
| Methyl Ethyl Ketone Resistance Test [Double Rubs] | | 51 | 53 | 78 |
| Coating Thickness [mils.] | | 1.63 | 1.7 | 1.9 |

Sample Description: Latex X+1% of 20% DY 9577/Dowanol PnB+3% of 40% Y-1 emulsion

| SAMPLES | pH |
|---|---|
| Latex X | 6.68 |
| Latex X + 1% of 20% DY 9577/Dowanol PnB. | 6.59 |
| Latex X + 1% of 20% DY 9577/Dowanol PnB + 3% of 40% Y-1 emulsion | 6.66 |

| CURING CYCLE: 15 min. baked @ 150° F., Cured for: | | | | |
|---|---|---|---|---|
| | | CURING TIME | | |
| | | .17 day | 3 days | 7 days |
| Print Resistance Test | | | | |
| At 50° C. for [2 hr.] | 2 lb. | 5 | 5 | 3 |
| | 4 lb. | 1 | 1 | 1 |
| At Room Temp. [4 hr.] | 2 lb. | 10 | 10 | 10 |
| | 4 lb. | 10 | 10 | 10 |
| Pencil Hardness | | 2B | 2B | HB |
| Methyl Ethyl Ketone Resistance Test [Double Rubs] | | 28 | 28 | 27 |
| Coating Thickness [mils.] | | 1.4 | 1.6 | 1.3 |

Sample Description: Latex X+1% of 65% Dibutyl Tin Oxide Dispersion+3% of 40% Y-1 emulsion

| SAMPLES | pH |
|---|---|
| Latex X | 6.68 |
| 65% Dibutyl Tin Oxide Dispersion [lot #52-4) | 9.22 |
| Latex X + 1% of 65% Dibutyl Tin Oxide Dispersion | 6.89 |
| Latex X + 1% of 65% Dibutyl Tin Oxide Dispersion + 3% of 40% Y-1 emulsion | 7.16 |

| CURING CYCLE: 15 min baked @ 150° F., Cured for: | | | | |
|---|---|---|---|---|
| | | CURING TIME | | |
| | | .17 day | 3 days | 7 days |
| Print Resistance Test | | | | |
| At 50° C. for [2 hr.] | 2 lb. | 5 | 8 | 9 |
| | 4 lb. | 3 | 6 | 8 |
| At Room Temp. [4 hr.] | 2 lb. | 10 | 10 | 10 |
| | 4 lb. | 10 | 10 | 10 |
| Pencil Hardness | | 2B | HB | HB |
| Methyl Ethyl Ketone Resistance Test [Double Rubs] | | 66 | 160 | 160 |
| Coating Thickness [mils.] | | 1.5 | 1.5 | 1.8 |

Sample Description: Rhoplex CL—204, Formulation WR—204—2 [no additive]

| SAMPLES | pH |
|---|---|
| Rhoplex CL 204 | 6.72 |
| Rhoplex WR-204-2 [Formulated] | 8.1 |

| CURING CYCLE FOR COATED PANELS: 15 min. baked @ 150° F., Cured for: | | | | |
|---|---|---|---|---|
| | | CURING TIME AT AMBIENT TEMP. | | |
| | | .17 day | 3 days | 7 days |
| Print Resistance Test | | | | |
| at 50° C. for 2 hr. | 2 lb | 10 | 10 | 10 |
| | 4 lb | 10 | 10 | 10 |
| AT Room Temp. [4 hr.] | 2 lb | 10 | 10 | 10 |
| | 4 lb | 10 | 10 | 10 |
| Pencil Hardness | | 2B | B | 2B |
| Methyl Ethyl Ketone Resistance Test [Double Rubs] | | 19 | 17 | 19 |
| Coating Thickness [mils.] | | 2.8 | 1.7 | 2.8 |

Sample Description: Rhoplex CL—204, Formulation WR—204—2+3% of 40% emulsion of silane "Y-2" [2-(3,4-Epoxycyclohexyl)ethyltriethoxy silane]

| SAMPLES | pH |
|---|---|
| Rhoplex CL 204 | 6.72 |
| Rhoplex WR-204-2 [Formulated] | 8.1 |
| Rhoplex WR-204-2 + 3% Y-2 emulsion | 8.13 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for 2 hr. | 2 lb. | 10 | 9 | 10 |
| | 4 lb. | 9 | 9 | 10 |
| At Room Temp. [4 hr.] | 2 lb. | 10 | 10 | 10 |
| | 4 lb. | 10 | 10 | 10 |
| Pencil Hardness | | B | B | B |
| Methyl Ethyl Ketone Resistance Test [Double Rubs] | | 33 | 30 | 149 |
| Coating Thickness [mils.] | | 1.5 | 1.9 | 1.4 |

Sample Description: Rhoplex CL 204, Formulation 204—2+1% Benyltrimethylammonium Chloride+3% of 40% Y-2 emulsion

| SAMPLES | pH |
|---|---|
| Rhoplex CL 204 | 6.72 |
| Rhoplex WR 204-2 | 8.1 |
| Rhoplex WR 204-2 + 1% Benzyltrimethylammonium Chloride | 8.2 |
| Rhoplex WR 204-2 + 1% Benzyltrimethylammonium Chloride + 3% of 40% Y-2 emulsion | 8.35 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C for [2 hr.] | 2 lb. | 8 | 8 | 9 |
| | 4 lb. | 7 | 7 | 8 |
| At Room Temp. [4 hr.] | 2 lb. | 10 | 10 | 10 |
| | 4 lb. | 8 | 0 | 10 |
| Pencil Hardness | | >5B | 3B | 2B |
| Methyl Ethyl Ketone Resistance Test [Double Rubs] | | 23 | 29 | 32 |
| Coating Thickness [mils.] | | 1.5 | 1.7 | 1.9 |

Sample Description: Rhoplex CL-204, Formulation 204—2+0.4% (Ethyl)triphenylphosphonium Bromide+3% of 40% Y-2 emulsion

| SAMPLES | pH |
|---|---|
| Rhoplex WR 204-2 | 8.1 |
| Rhoplex WR-204-2 + 0.4% (Ethyl)triphenylphosphonium Bromide [5% (Ethyl)triphenylphosphonium Bromide + 81.94% water + 1.85% Arcosolve DPTB, + 3.71% Arcosolve DPM and 7.5% Butyl Propasol.] | 8.4 |
| Rhoplex WR-204-2 + .4%(Ethyl) triphenylphosphonium Bromide [5% (Ethyl)triphenylphosphonium Bromide + 81.94% water + 1.85% Arcosolve DPTB, 3.71% Arcosolve DPM and 7.5% Butyl Propasol] + 3% of 40% Y-2 emulsion | 8.5 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 9 | 10 | 10 |
| | 4 lb. | 8 | 10 | 10 |
| At Room Temp. [4 hr.] | 2 lb. | 10 | 10 | 10 |
| | 4 lb. | 10 | 10 | 10 |
| Pencil Hardness | | B | B | B |
| Methyl Ethyl Ketone Resistance Test [Double Rubs] | | 24 | 70 | 24 |
| Coating Thickness [mils.] | | 1.8 | 1.5 | 1.6 |

Sample Description: Rhoplex CL 204, Formulation WR 204—2+1% EMI—24 [15% EMI—24/Water]+3% of 40% Y-2 emulsion

| SAMPLES | pH |
|---|---|
| Rhoplex WR 204-2 | 8.1 |
| Rhoplex WR 204-2 + 1% EMI-24 [15% EMI-24] | 8.75 |
| Rhoplex WR-204-2 + 1% EMI-24 + 3% of 40% Y-2 emulsion | 8.86 |

CURING CYCLE FOR COATED PANELS: 15 min. baked @ 150° F., Cured for:

PANELS:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 10 | 10 | 10 |
| | 4 lb. | 9 | 10 | 10 |
| At Room Temp. [4 hr.] | 2 lb. | 10 | 10 | 10 |
| | 4 lb. | 10 | 10 | 10 |
| Pencil Hardness | | B | B | B |
| Methyl Ethyl Ketone Resistance Test [Double Rubs] | | 21 | 219 | >400 |
| Coating Thickness [mils.] | | 1.5 | 1.6 | 1.6 |

Sample Description: Rhoplex WR—204—2+1% N-Benzyl-N-Dimethylamine (BMDA) [50% BMDA, 3.7% Arcosolve DPTB, 7.4% Arcosolve DPM and 38.9% Butyl Propasol]+3% of 40% Y-2 emulsion

| SAMPLES | pH |
|---|---|
| Rhoplex WR-204-2 | 8.1 |
| Rhoplex WR-204-2 + 1% N-Benzyl-N- | 8.9 |

| | |
|---|---|
| Dimethylamine [BMDA]<br>[50% BMDA, 3.7% Arcosolve DPTB, 7.4% Arcosolve DPM, and 38.9% Butyl Propasol] | |
| Rhoplex WR-204-2 + 1% N-Benzyl-N-Dimethylamine [BMDA]<br>[50% BMDA, 3.7% Arcosolve DPTB, 7.4% Arcosolve DPM and 38.9% Butyl Propasol] + 3% of 40% Y-2 emulsion | 8.9 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 10 | 10 | 10 |
| | 4 lb. | 9 | 10 | 10 |
| At Room Temp. [4 hr.] | 2 lb. | 10 | 10 | 10 |
| | 4 lb. | 10 | 10 | 10 |
| Pencil Hardness | | B | HB | HB |
| Methyl Ethyl Ketone Resistance Test [Double Rubs] | | 26 | 68 | 192 |
| Coating Thickness [mils.] | | 1.9 | 1.9 | 1.7 |

Sample Description: Rhoplex CL—204 (Unformulated Resin)+0.4% (Butyl)—triphenylphosphonium Bromide [2.66% Butyltriphenylphosphonium Bromide, 24.75% Arcosolve DPM, 12.34% Arcosolve DPTB, 50.05% Butyl Propasol and 10.2% Water]+3% of 40% Y-2 emulsion

| SAMPLES | pH |
|---|---|
| Rhoplex CL-204 (unformulated) | 6.78 |
| Rhoplex CL-204 (Unformulated, pH adjusted to 8.5 with 14% Ammonium Hydroxide solution.) | 8.5 |
| Rhoplex CL-204 [pH 8.5, Unformulated] + 0.4% (Butyl)-triphenylphosphinium Bromide [2.66% (Butyl)triphenylphosphonium Bromide] | 7.9 |
| Rhoplex CL-204 [pH 8.5, Unformulated] + 0.4% (Butyl)-triphenylphosphinium Bromide [2.66% (Butyl)triphenylphosphonium Bromide] + 3% of 40% Y-2 emulsion | 8.01 |

Sample Description: Rhoplex CL-204 (Unformulated resin)+0.4% (Butyl-triphenylphosphonium Bromide [2.66% Butyltriphenyl phosphomium Bromide, 24.75% Arcosolve DPM, 12.34 Arcosolve DPTB, 50.05% Butyl Propasol and 10.2% Water]+3% of 40% Y-2 emulsion CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 10 | 10 | 10 |
| | 4 lb. | 2 | 9 | 6 |
| At Room Temp. [4 hr.] | 2 lb. | 10 | 10 | 10 |
| | 4 lb. | 10 | 10 | 10 |
| Pencil Hardness | | B | HB | B |
| Methyl Ethyl Ketone Resistance Test [Double Rubs] | | 48 | 48 | 231 |
| Coating Thickness [mils.] | | 1.7 | 1.9 | 1.3 |

Sample Description: Rhoplex WR—204—2+1% of 9.49% Anquamide 360 [Anquamide 9.49%, Arcosolve DPTB, 18% Butyl Propasol 68.91%, Water 4.59%]+3% of 40% Y-2 emulsion

| SAMPLES | pH |
|---|---|
| Rhoplex WR-204-2 | 8.1 |
| Rhoplex WR-204-2 + 1% of Anquamide 360 [Anquamide 9.49%, Arcosolve DPTB 18%, Butyl Propasol 68.91%, Water 4.59%] | 8.2 |
| Rhoplex WR-204-2 + 1% of Anquamide 360 + 3% of 40% Y-2 emulsion | 8.26 |

CURING CYCLE FOR COATED PANELS: 15 min. baked @ 150° F., Cured for:

| | | CURING TIME AT AMBIENT TEMP. | | |
|---|---|---|---|---|
| | | .17 day | 3 days | 7 days |
| Print Resistance Test | | | | |
| At 50° C. for [2 hr.] | 2 lb. | 9 | 10 | 10 |
| | 4 lb. | 5 | 9 | 9 |
| At Room Temp. [4 hr.] | 2 lb. | 10 | 10 | 10 |
| | 4 lb. | 10 | 10 | 10 |
| Pencil Hardness | | F | F | F |
| Methyl Ethyl Ketone Resistance Test [Double Rubs] | | 18 | 31 | 139 |
| Coating Thickness [mils.] | | 1.6 | 1.7 | 1.6 |

Sample Description: Rhoplex CL—204—2+1% of a 20% formulation of silane "Y-3" {1-[3-(trimethoxysilyl)propyl]-1H-Imidazole} (The emulsion consisted of {20% silane Y-3, Ethanol 200 proof 53.3%, Distilled water 17.78%, Glacial Acetic acid 8.89%. The pH of the mixture was adjusted to 8.5–9.0 with conc. Ammonium Hydroxide]+ 3% of a 40% emulsion of silane Y-2.

| SAMPLES | pH |
|---|---|
| Rhoplex CL-204-2 | 8.1 |
| Rhoplex CL-204-2 + 1% of a 20% formulation of silane Y-2 | 8.3 |
| Rhoplex CL-204-2 + 1% of a 20% formulation of silane Y-3 + 3% of a 40% emulsion of silane Y-2 | 8.3 |

-continued

CURING CYCLE FOR COATED PANELS: 15 min. baked @ 150° F., Cured for:

|  |  | CURING TIME AT AMBIENT TEMP. | | |
|---|---|---|---|---|
|  |  | .17 day | 3 days | 7 days |
| Print Resistance Test |  |  |  |  |
| At 50° C. for [2 hr.] | 2 lb. | 10 | 10 | 10 |
|  | 4 lb. | 10 | 10 | 10 |
| At Room Temp. [4 hr.] | 2 lb. | 10 | 10 | 10 |
|  | 4 lb. | 10 | 10 | 10 |
| Pencil Hardness |  | 2B | B | F |
| Methyl Ethyl Ketone Resistance Test [Double Rubs] |  | 72 | 219 | >400 |
| Coating Thickness [mils.] |  | 1.5 | 1.6 | 1.9 |

Sample Description: Rhoplex WR—204—2+1% of the 20% formulation of Y-3+3% of the 40% emulsion of silane Y-2

| SAMPLES | pH |
|---|---|
| Rhoplex WR-204-2 | 8.1 |
| Rhoplex WR-204-2 + 1% of 20% formulation of Y-3 | 8.3 |
| Rhoplex WR-204-2 + 1% of 20% formulation of Y-3 + 3% of 40% emulsion of Y-2 | 8.3 |

CURING CYCLE FOR COATED PANELS: [Non Baked] @ Ambient Temp., Cured for:

|  |  | CURING TIME AT AMBIENT TEMP. | | |
|---|---|---|---|---|
|  |  | .17 day | 3 days | 7 days |
| Print Resistance Test |  |  |  |  |
| At 50° C. for [2 hr.] | 2 lb. | 10 | 10 | 10 |
|  | 4 lb. | 9 | 10 | 10 |
| At Room Temp. [4 hr.] | 2 lb. | 10 | 10 | 10 |
|  | 4 lb. | 10 | 10 | 10 |
| Pencil Hardness |  | B | B | F |
| Methyl Ethyl Ketone Resistance Test [Double Rubs] |  | 28 | 52 | >400 |
| Coating Thickness [mils.] |  | 1.5 | 1.3 | 1.4 |

Sample Description: Rhoplex WR—204—2+1% Anquamine-401 [15% Anquamine] and 85% water]+3% of 40% Y-2 emulsion

| SAMPLES | pH |
|---|---|
| Rhoplex WR-204-2 | 8.2 |
| Rhoplex WR-204-2 + 1% Anquamine-401 [15% Anquamine-40 and 85% water] | 8.6 |
| Rhoplex WR-204-2 + 1% Anquamine-401 [15% Anquamine and 85% water] + 3% of 40% Y-2 emulsion | 8.76 |

-continued

CURING CYCLE FOR COATED PANELS : 15 min. baked @ 150° F., Cured for:

|  |  | CURING TIME AT AMBIENT TEMP. | | |
|---|---|---|---|---|
|  |  | .17 day | 3 days | 7 day |
| Print Resistance Test |  |  |  |  |
| At 50° C. for [2 hr.] | 2 lb. | 10 | 10 | 10 |
|  | 4 lb. | 6 | 10 | 10 |
| At Room Temp. [4 hr.] | 2 lb. | 10 | 10 | 10 |
|  | 4 lb. | 10 | 10 | 10 |
| Pencil Hardness |  | F | F | F |
| Methyl Ethyl Keytone Resistance Test [Double Rubs] |  | 27 | 28 | 142 |
| Coating Thickness [mils.] |  | 1.8 | 1.7 | 1.8 |

Sample Description: Rhoplex WR—204—2+1% EMI [50% EMI+25% Ethanol+25% water] and 3% of 40% Y-1 emulsion

| SAMPLES | pH |
|---|---|
| Rhoplex WR-204-2 | 8.1 |
| Rhoplex WR-204-2 + 1% EMI [50% EMI + 25% Ethanol + 25 % water] | 8.2 |
| Rhoplex WR-204-2 + 1% EMI [50 % EMI + 25% Ethanol + 25% water) and 3% Y-1 emulsion] | 8.2 |

CURING CYCLE : 15 min. baked @ 150° F., Cured for:

|  |  | CURING TIME | | |
|---|---|---|---|---|
|  |  | .17 day | 3 days | 7 days |
| Print Resistance Test |  |  |  |  |
| At 50° C. for [2 hr.] | 2 lb. | 9 | 10 | 10 |
|  | 4 lb. | 9 | 9 | 10 |
| At Room Temp. [4 hr.] | 2 lb. | 10 | 10 | 10 |
|  | 4 lb. | 10 | 10 | 10 |
| Pencil Hardness |  | 2B | 2B | HB |
| Methyl Ethyl Ketone Resistance Test [Double Rubs] |  | 62 | 73 | >400 |
| Coating Thickness [mils.] |  | 1.7 | 1.2 | 1.6 |

Sample Description: Rhoplex WR—204—2+1% EMI [50% EMI+25% Ethanol+25% water] and 3% of 40% Y-1 emulsion}

| SAMPLES | pH |
|---|---|
| Rhoplex WR-204-2 | 8.1 |
| Rhoplex WR-204-2 + 1% EMI [50% EMI + 25% Ethanol + 25 % water] | 8.2 |
| Rhoplex WR-204-2 + 1% EMI [50% EMI + 25% Ethanol + 25 % water] and 3% Y-1 emulsion | 8.2 |

Sample Description: Rhoplex CL—204—2+1% silane Y-3

| SAMPLES | pH |
|---|---|
| Rhoplex WR-204-2 | 8.1 |
| Rhoplex CL-204-2 + 1% Silane Y-1 | 8.3 |

| CURING CYCLE: 15 mins. baked @ 150° F., Cured for: | | | | |
|---|---|---|---|---|
| | | CURING TIME | | |
| | | .17 day | 3 days | 7 days |
| Print Resistance Test | | | | |
| At 500 C. for [2 hr.] | 2 lb. | 6 | 10 | 10 |
| | 4 lb. | 3 | 10 | 10 |
| At Room Temp. [4 hr.] | 2 lb. | 10 | 10 | 10 |
| | 4 lb. | 10 | 10 | 10 |
| Pencil Hardness | | 3B | 2B | 2B |
| Methyl Ethyl Ketone Resistance Test [Double Rubs] | | 20 | 20 | 19 |
| Coating Thickness [mils.] | | 1.5 | 1.2 | 1.5 |

Sample Description: Latex X+1% of the 20% formulation of Y-3+3% of the 40% emulsion of Y-2

| SAMPLES | pH |
|---|---|
| Latex X | 6.61 |
| Latex X + 1% of 20% Y-3 formulation | 6.13 |
| Latex X + 1% of 20% Y-3 formulation + 3% of 40% Y-2 emulsion. | 6.13 |

| CURING CYCLE: 15 mins baked @ 150° F., Cured for: | | | | |
|---|---|---|---|---|
| | | CURING TIME | | |
| | | .17 day | 3 days | 7 days |
| Print Resistance Test | | | | |
| At 500 C. for [2 hr.] | 2 lb. | 7 | 7 | 7 |
| | 4 lb. | 5 | 5 | 9 |
| At Room Temp. [4 hr.] | 2 lb. | 10 | 10 | 10 |
| | 4 lb. | 10 | 10 | 10 |
| Pencil Hardness | | 3B | HB | HB |
| Methyl Ethyl Ketone Resistance Test [Double Rubs] | | 32 | 55 | >400 |
| Coating Thickness [mils.] | | 1.6 | 1.2 | 1.5 |

Sample Description: Latex X+1% of the 20% formulation of Y-3+3% of the 40% Y-2 emulsion

| SAMPLES | pH |
|---|---|
| Latex X | 6.61 |
| Latex X + 1% of 20% Y-3 formulation | 6.13 |
| Latex X + 1% of 20% Y-3 formulation + 3% of 40% Y-2 emulsion | 6.13 |

| CURING CYCLE : Non baked @ Room Temperature, Cured for: | | | | |
|---|---|---|---|---|
| | | CURING TIME | | |
| | | .17 day | 3 days | 7 days |
| Print Resistance Test | | | | |
| At 500 C. for [2 hr.] | 2 lb. | 7 | 8 | 7 |
| | 4 lb. | 5 | 7 | 7 |
| At Room Temp. [4 hr.] | 2 lb. | 10 | 10 | 10 |
| | 4 lb. | 10 | 10 | 10 |
| Pencil Hardness | | 3B | HB | HB |
| Methyl Ethyl Ketone Resistance Test [Double Rubs] | | 30 | 51 | >400 |
| Coating Thickness [mils.] | | 1.4 | 1.6 | 1.7 |

We claim:

1. A composition comprising: (a) 0.1 to 20 weight percent of a water insoluble or slightly soluble epoxysilane; (b) 10 to 80 weight percent of water; (c) 25 to 60 weight percent of a polymer with pendant carboxylic acid groups; and (d) 0.1 to 20 weight percent of a tertiary amine catalyst wherein the epoxy silane is selected from the group consisting of:

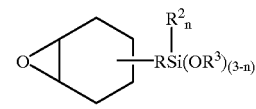

where:

R is $(CH_2)_m$, where m has a value of zero to six;

$R^2$ is an alkyl, alkoxy-substituted allyl, aryl or aralkyl group, each of said groups having from one to ten carbon atoms;

$R^3$ is an alkyl, alkoxy-substituted alkyl, aryl or aralkyl group, each of said groups having from two to ten carbon atoms; and n has a value of zero, one or two.

2. A composition according to claim 1 which is an emulsion and comprises an emulsifier.

3. A composition according to claim 2 wherein the emulsifier is selected from the group consisting of: polyoxyethylene alkyl ethers, polyoxyethylene alkyl phenyl ethers, polyoxyethylene fatty acid esters, sorbitan fatty acid esters, polyoxyethylene sorbitan fatty acid esters, fatty acid salts, alkyl sulfate ester salts, alkyl benzene sulfonate, alkyl phosphate, alkylallyl, sulfate ester salt, polyoxyethylene alkylphosphate ester, quaternary ammonium salts, alkyl trimethylammonium salts, alkyl benzyl dimethyl ammonium salts, and dialkyl dimethyl ammonium salts.

4. A composition according to claim 1 wherein the catalyst comprises N-benzyl-N-dimethylamine.

5. A composition according to claim 1 wherein the catalyst comprises tris-2,4,6-(dimethylaminomethyl)phenol).

6. A composition according to claim 1 wherein the catalyst comprises tetraethylenepentamine.

7. A coating made from a composition according to claim 1.

8. A composition according to claim 1 additionally comprising a pH buffer.

9. The composition of claim 1 wherein the tertiary amine has a nittrogen atom substituted with three substituents selected from the group consisting of alkyl containing 1 to 6 carbons atoms, unsubstituted benzyl, benzyl substituted with one or more alkyl containing 1 to 6 carbon atoms or hydroxyl and dialkylaminoalkylene wherein each alkyl contains 1 to 6 carbon atoms and the alkylene bridge contains 1 to 6 carbon atoms.

10. The composition of claim 9 wherein the tertiary amine is substituted with three alkyl groups of 1 to 6 carbon atoms.

11. The composition of claim 9 wherein the tertiary amine is substituted with an unsubstituted benzyl group.

12. The composition of claim 9 wherein the tertiary amine is substituted with a dialkylaminoalkylene group wherein alkyl contains 1 to 6 carbon atoms and the alkylene bridge contains 1 to 6 carbon atoms.

13. The composition of claim 9 wherein the tertiary amine is substituted with a benzyl substituted with one or more alkyl containing 1 to 6 carbon atoms or hydroxyl.

* * * * *